United States Patent [19]

Lauer et al.

[11] 4,299,025
[45] Nov. 10, 1981

[54] METHODS AND APPARATUS FOR PLACING WINDINGS IN STATOR CORE SLOTS AND COIL INJECTION MACHINE TOOL PACKS

[75] Inventors: Richard E. Lauer; Dallas F. Smith, both of Fort Wayne, Ind.

[73] Assignee: General Electric Company, Fort Wayne, Ind.

[21] Appl. No.: 23,351

[22] Filed: Mar. 23, 1979

Related U.S. Application Data

[62] Division of Ser. No. 857,222, Dec. 5, 1977, Pat. No. 4,151,636.

[51] Int. Cl.³ .......................................... H02K 15/06
[52] U.S. Cl. ................................ 29/596; 29/564.1; 29/734; 29/736
[58] Field of Search ............... 29/596, 598, 732, 734, 29/736, 564.1; 149/92.1, 1

[56] References Cited

U.S. PATENT DOCUMENTS

| | | | |
|---|---|---|---|
| 3,324,536 | 6/1967 | Hill | 29/734 |
| 3,402,462 | 9/1968 | Walker et al. | 29/596 |
| 3,481,372 | 12/1969 | Eminger et al. | 140/92.1 |
| 3,557,432 | 1/1971 | Pavesi | 29/736 |
| 3,624,891 | 12/1971 | Droll | 29/832 |
| 3,625,261 | 12/1971 | Hill et al. | 140/92.1 |
| 3,672,027 | 6/1972 | Arnold | 29/596 |
| 3,691,606 | 9/1972 | Muskulus | 29/736 |
| 3,698,063 | 10/1972 | Smith | 29/734 |
| 3,762,017 | 10/1973 | Droll | 29/732 |
| 3,815,207 | 6/1974 | Habegger | 29/596 X |
| 3,828,830 | 8/1974 | Hill et al. | 140/9.21 |
| 3,829,953 | 8/1974 | Lauer et al. | 29/734 |
| 3,874,424 | 4/1975 | Muskulus | 140/92.1 |
| 3,977,444 | 8/1976 | Lauer et al. | 140/92.1 |
| 4,106,185 | 8/1978 | Lauer | 29/596 |

FOREIGN PATENT DOCUMENTS

2014880 9/1979 United Kingdom ................ 29/596

*Primary Examiner*—Carl E. Hall
*Attorney, Agent, or Firm*—Ralph E. Krisher, Jr.

[57] ABSTRACT

An injection shuttle system is disclosed for fabricating stator core assemblies. Injection tooling and a stator core are selected and positioned on a shuttle means at a selection station for moving to coil loading stations and a transfer station. The injection tooling is positioned, aligned and manipulated relative to a winding machine at each coil loading station for disposing winding turns thereon. At the transfer station, the injection tooling is transferred to a wedge guide housing of a turntable arrangement which includes wedge making and injection stations. A stator height adjustment arrangement is provided for adjusting the wedge making and injection stations in accordance with the axial length of the core. The injection tooling is moved or indexed to the wedge making stations where insulating wedges are fabricated and inserted into wedge guides of the wedge guide housing. The injection tooling is then moved to the injection station where the core is interfitted with the tooling by a core transfer assembly. An injection mechanism at the injection station then injects or transfers the winding turns and insulating wedges into axially extending slots of the core. The end turns of the windings are then moved away from the bore of the core by an end turn separator. The injection tooling with winding turns removed therefrom is indexed or moved to an unloading station where it is transferred from the turntable arrangement to a shuttle means for subsequent transfer back to the selection station.

8 Claims, 25 Drawing Figures

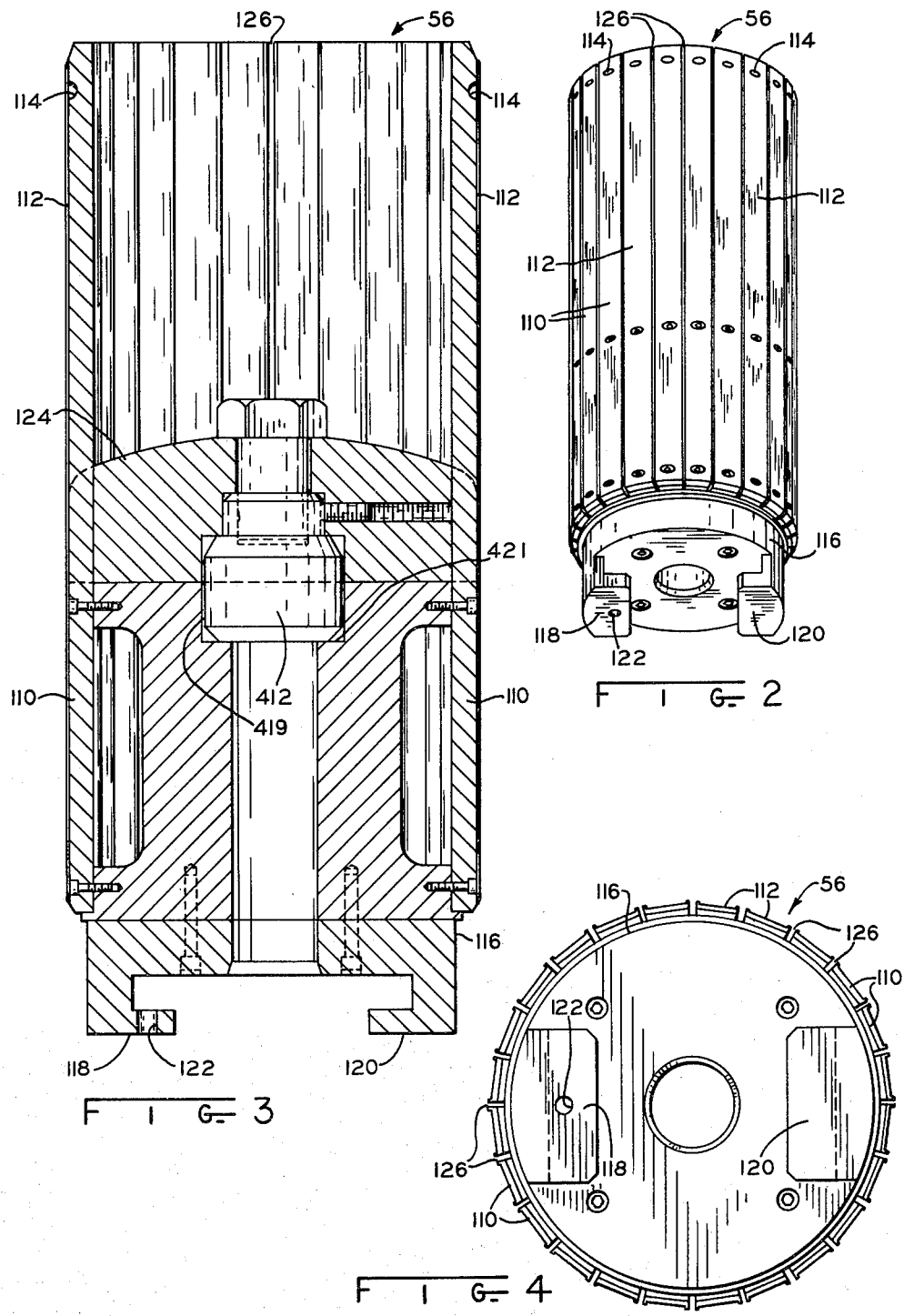

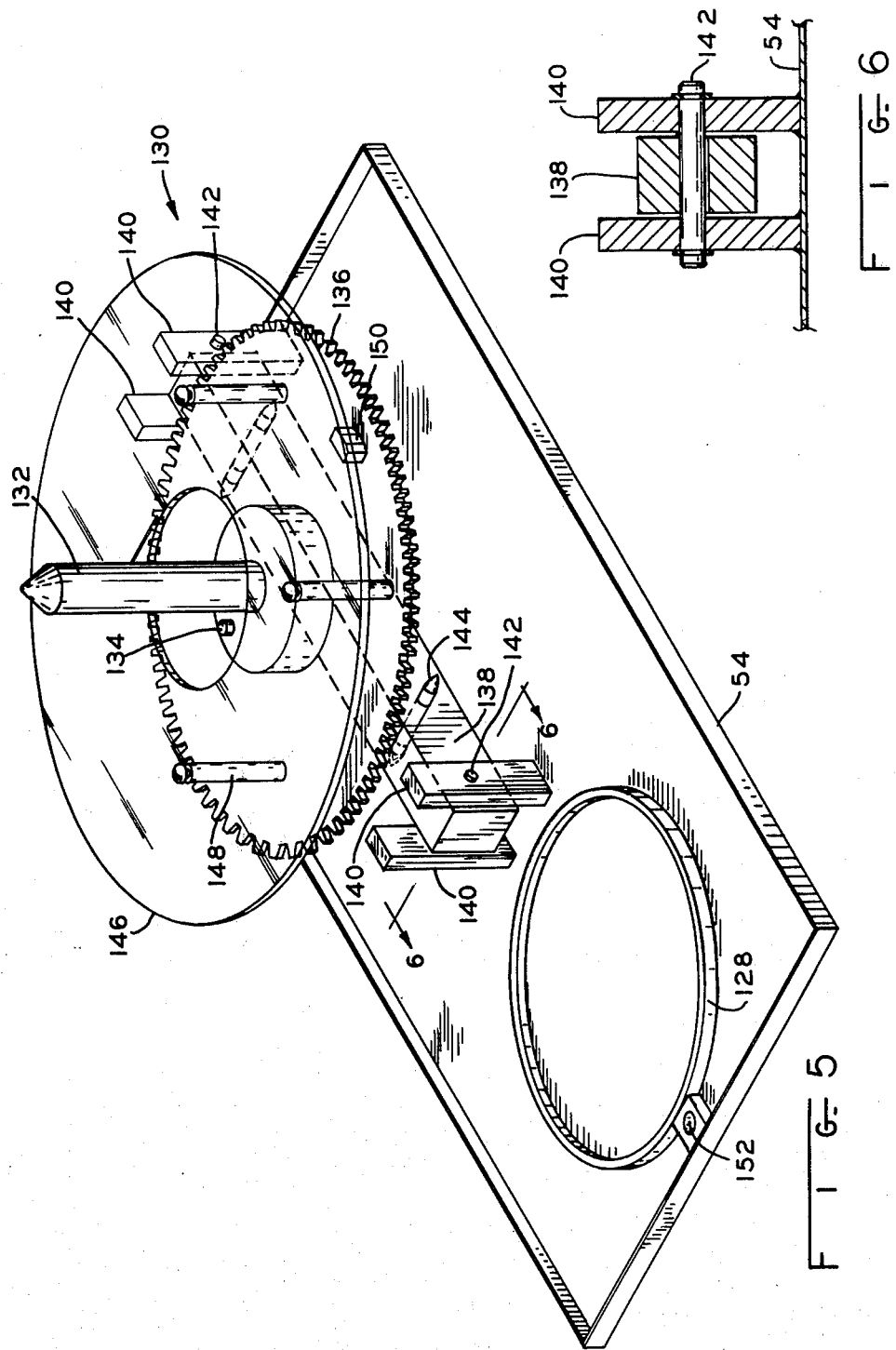

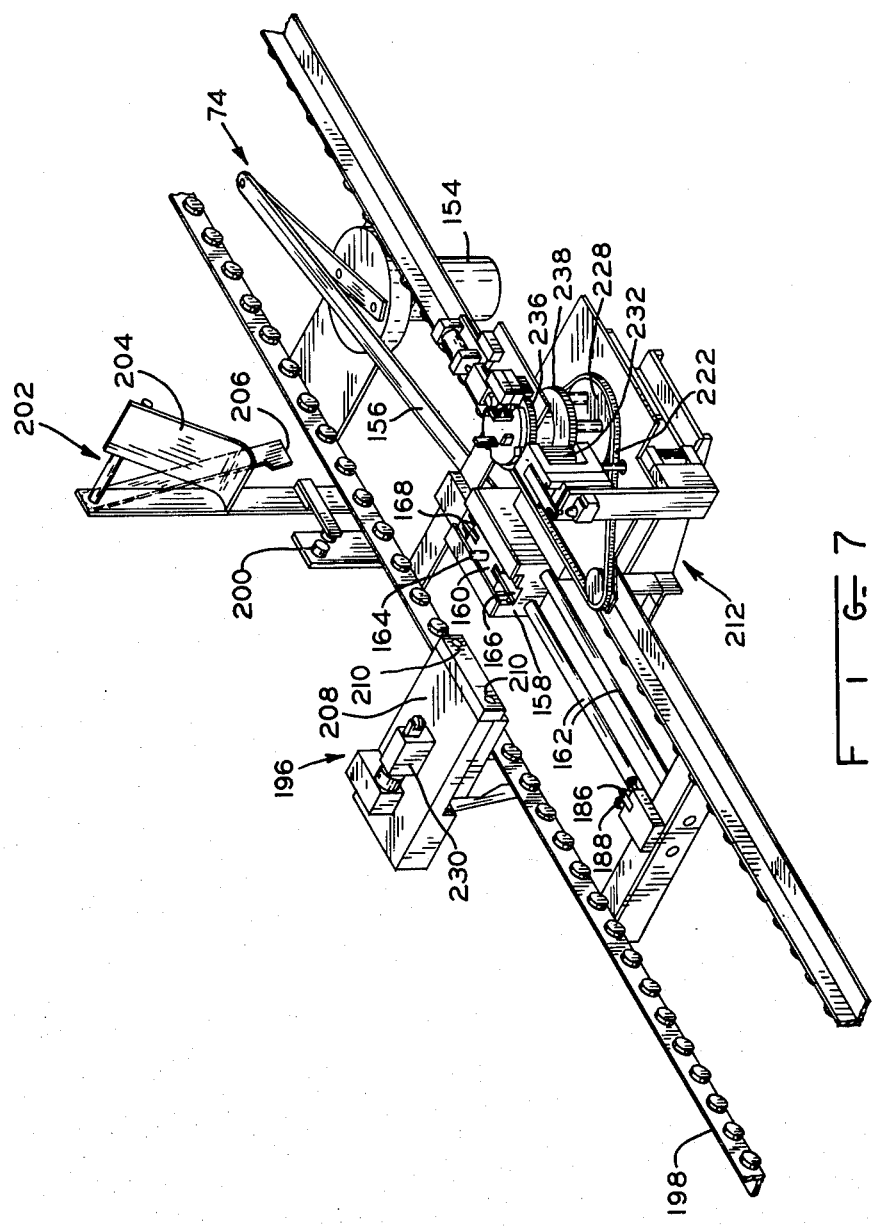

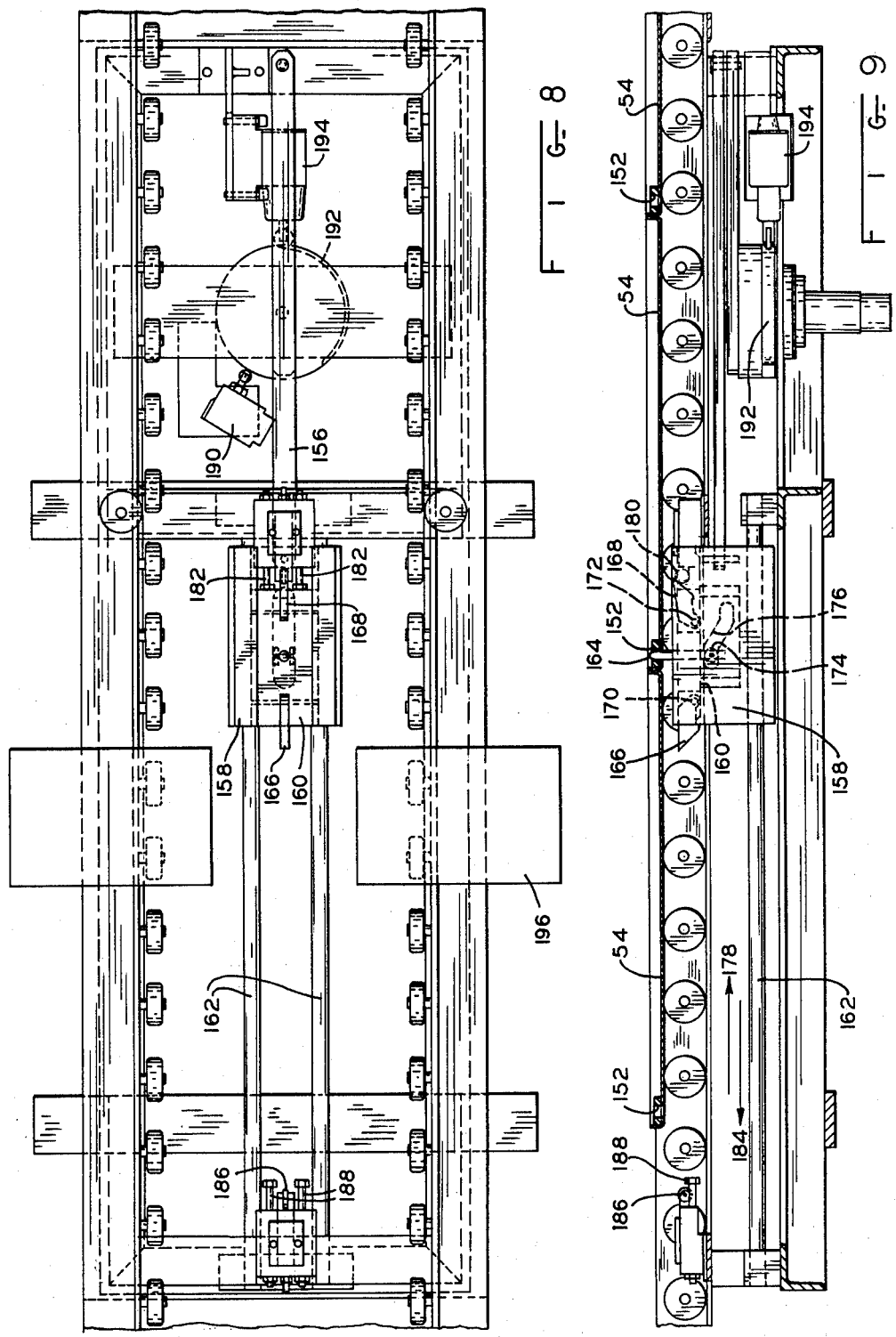

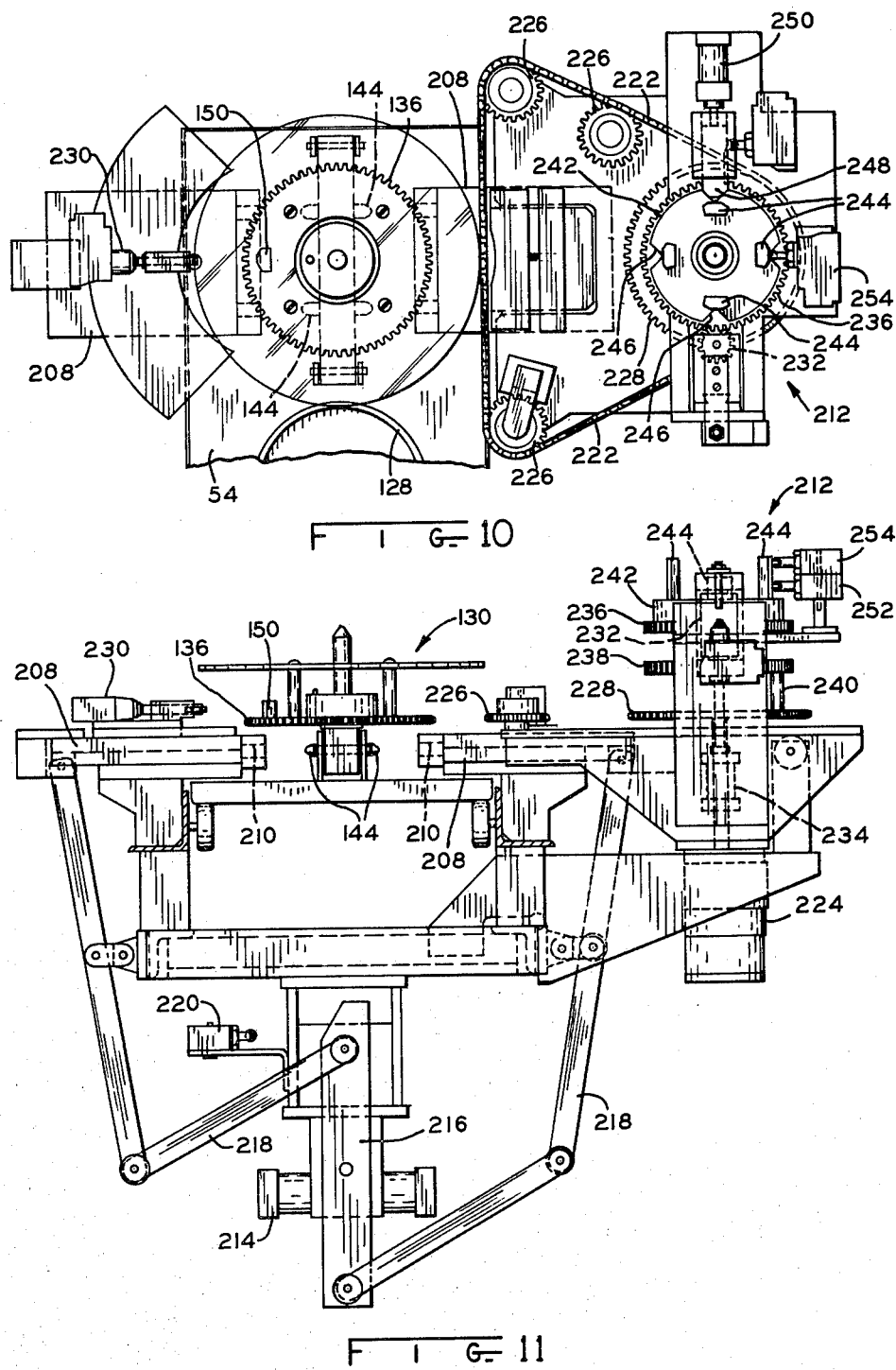

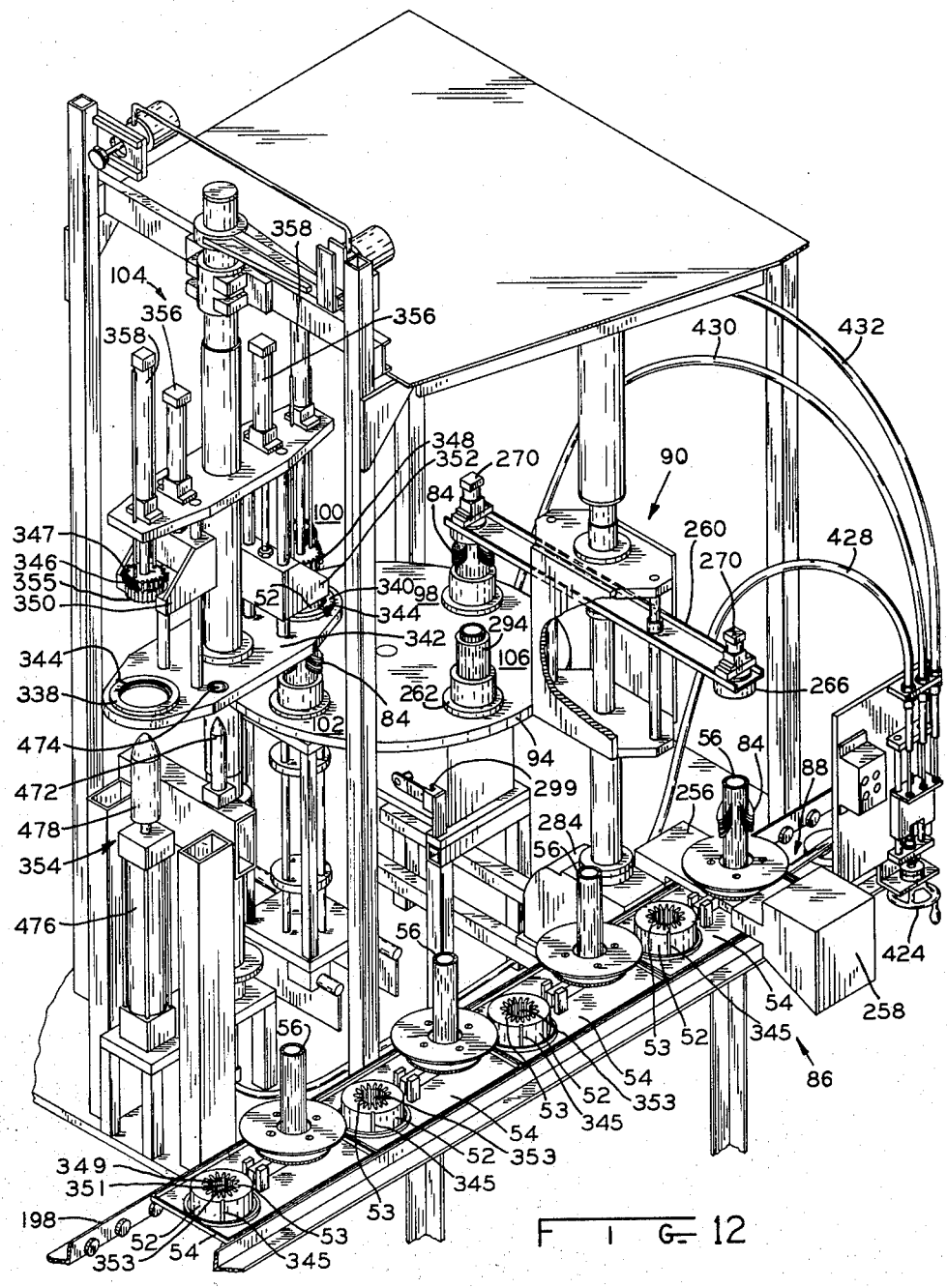

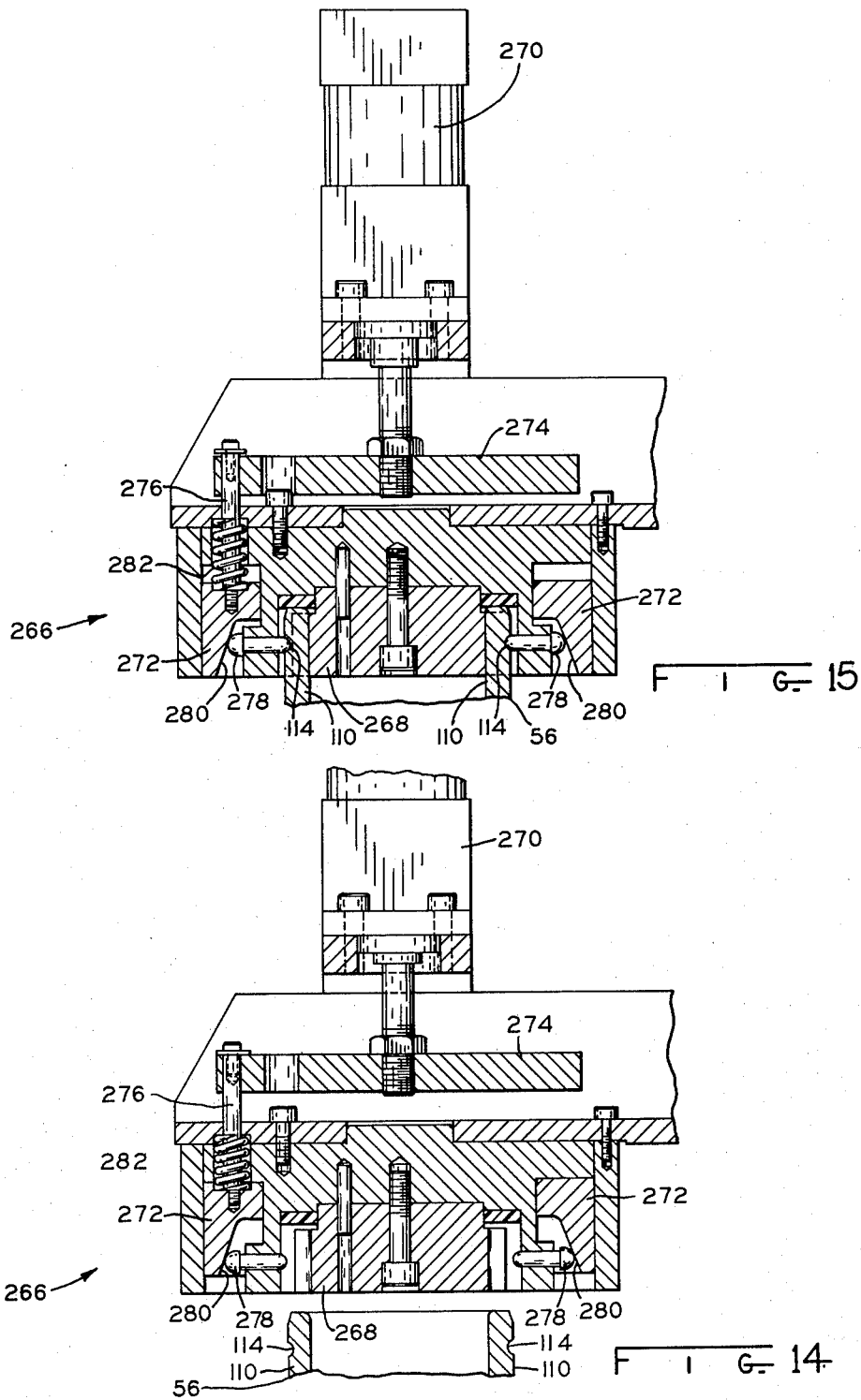

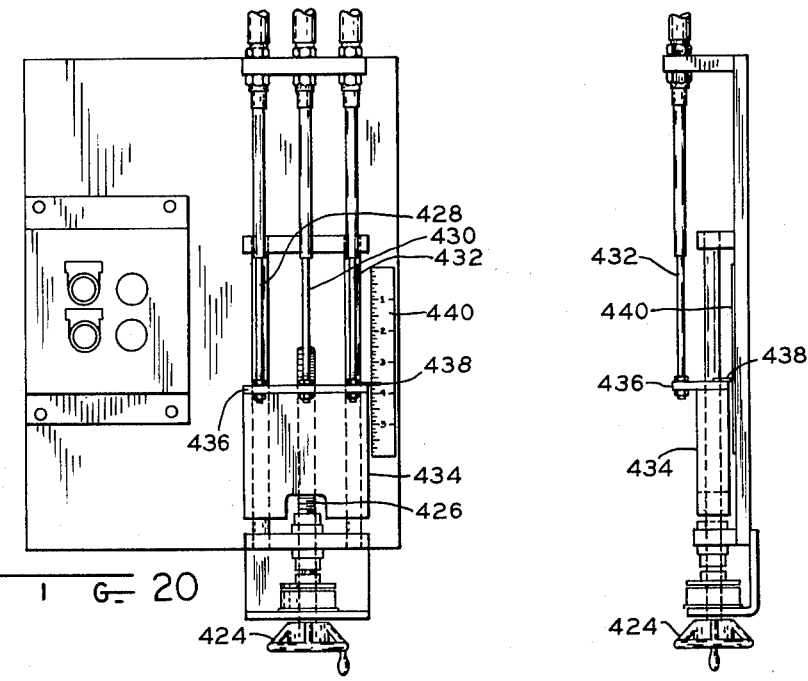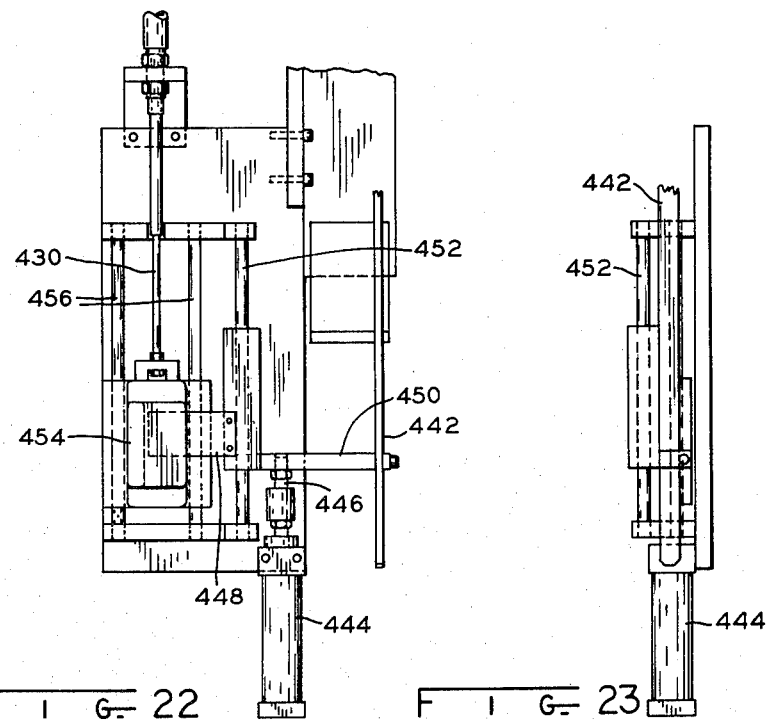

METHODS AND APPARATUS FOR PLACING WINDINGS IN STATOR CORE SLOTS AND COIL INJECTION MACHINE TOOL PACKS

CROSS REFERENCE TO RELATED APPLICATION

This application is a division of our patent application Ser. No. 857,222 filed on Dec. 5, 1977, which issued into U.S. Pat. No. 4,151,636 on May 1, 1979 and is further related to co-pending application Ser. No. 805,701 filed on June 13, 1977 solely in the name of Richard E. Lauer, the entire disclosure of which is incorporated herein by reference, and at least a major portion of the subject matter of which is prior art as to the subject matter jointly claimed herein.

BACKGROUND OF THE INVENTION

This invention relates to methods and apparatus of particular use in the manufacture of dynamoelectric machine magnetic stator assemblies and more particularly to methods and apparatus involving movement of injection tooling and a core to coil loading and transfer stations; placement of winding turns on the injection tooling; transfer the tooling to a transporting mechanism and interfitting it with a wedge guide housing; movement of the tooling to wedge making and injection stations; alignment and transfer of the core into an interfitting relationship with the injection tooling; injection of the winding turns on the tooling into axially extending slots of the core; and removal of the core with windings thereon and the injection tooling from the injection station.

In the manufacture of magnetic stator assemblies used in dynamoelectric machines, windings comprising coils formed of a predetermined number of conductor turns are developed by a coil winding machine for subsequent insertion into a magnetic core. Various methods are known for carrying out this winding operation. In some prior art methods, winding coils are developed on coil forms, transferred to a transfer device, and then transferred to an insertion tool used for placing the windings on a core. Other known methods develop coils directly in a transfer tool or directly in coil injection tooling. In some cases, windings in the form of coils are disposed directly on insertion tooling mounted in a wedge guide housing. Developing coils directly in insertion tooling improves manufacturing efficiencies in that no intermediate step is required to transfer winding coils from a transfer tool to an insertion tool.

Efforts have been made to further improve manufacturing efficiencies by either both winding and inserting coils at a single operating station, or by utilizing one or more winding stations and an injection station with a rotating table. However, with either of the two above approaches, the manufacturing time is generally controlled by the operating time of the winding operation since generally the injection operation can be performed within a much shorter time than the winding operation.

Another known approach for improving the stator assembly manufacturing operation efficiencies is the utilization of several winding stations to dispose windings on insertion tools fixedly mounted in wedge guide housings. With this approach, wedge guide housings and the insertion tools attached thereto are moved from the winding stations to another station where a core is placed on the tooling. The combination housing, tooling and core are then fed to an injection station for insertion of the windings into the core. This type of an approach removes at least some of the time interdependency between the winding and injection operations.

However, with the above-discussed and other known prior approaches, attempts to more fully automate the manufacturing operation and at the same time maximize equipment utilization have required the transporting of an entire wedge guide housing between operating stations. Providing such a housing for each insertion tool adds considerable expense to the manufacturing operation; thus it would be beneficial to provide a method and apparatus wherein insertion tooling could alone be utilized during most of the manufacturing operation without having to provide an accompanying wedge guide housing for each insertion tool. Further benefits could be derived by developing a manufacturing operation wherein no transporting of wedge guide housings would be required, but instead, transport only of the insertion tooling itself on a means which could be easily moved and aligned at various stations where operations must be performed. Still further, benefits could be derived by developing a transporting means having an inserting tool support thereon which could easily be manipulated for performing winding and transfer operations.

In some prior approaches, a stator core when transported with insertion tooling has been positioned over the insertion tooling. With this type of an approach, a separate station is generally required with an additional operator and/or equipment being provided for placement of the core since the core must be positioned on the tooling after the winding operation has been completed. Thus, it would be advantageous to develop methods and apparatus wherein insertion tooling and a core to be used therewith could be selected at a single station and then transported together to winding and injection stations.

In many known prior approaches, stator assembly manufacturing operations have generally been set up to manufacture stator assemblies having cores of the same axial length. Equipment employed in such operations may often have the capability of manufacturing stator assemblies with different axial length stators; but such changeovers are often time consuming, thus, causing downtime in the manufacturing operation. Therefore, it would be advantageous to develop an arrangement whereby equipment employed in the manufacturing operation could be easily and quickly adjusted to manufacture stator assemblies having cores with different axial lengths.

Accordingly, it is a general object of the present invention to provide new and improved methods and apparatus for fabricating dynamoelectric machine stator core assemblies and a more specific object is to provide new and improved methods and apparatus which overcome the problems and deficiencies mentioned above.

A further object of the invention is to provide new and improved methods of transporting injection tooling without wedge guide housings.

A further object is to provide transporting methods and apparatus allowing injection tooling and core selection and loading at a single station.

A further object is to provide means for positioning and aligning core and injection tooling at stator assembly fabricating stations.

A still further object is to provide new and improved methods and apparatus for fabricating stator core assemblies having cores of different axial lengths.

SUMMARY OF THE INVENTION

In carrying out the present invention in one form thereof, we provide new and improved methods, apparatus, and systems for fabricating stator core assemblies.

One form of preferred system includes a selection station where injection tooling is selected for use with a slotted stator core. The tooling and core are positioned on a shuttle means and both are moved to a coil winding station where the injection tooling is positioned and aligned with a coil winding head located at the winding station and then manipulated relative to the winding head for developing and disposing winding turns onto the tooling. The injection tooling and core then are moved to another coil loading station where the tooling is again positioned, aligned and manipulated to dispose additional winding turns on the injection tooling. The injection tooling and core are then moved to a transfer station where the tooling is moved to a predetermined position and manipulated to be received by an injection tooling transfer assembly. The tooling transfer assembly transfers the tooling to a means for accommodating the tooling such as, for example, a wedge guide housing attached to an indexing support such as, for example, an indexing table of a turntable arrangement for movement to wedge making and injection stations. The tooling is then moved by the indexing table to an alignment position with a wedge magazine of a wedge maker. Insulating wedges are moved into the wedge guide housing and then the tooling is moved to another wedge making station where additional insulating wedges are moved into the housing. The injection tooling is moved by the indexing table and aligned with the injection mechanism at an injection station. The slotted core is positioned, aligned, and clamped in a stator retaining means of a core transfer assembly and then transferred to the injection station and moved into an interfitting relationship with the injection tooling. Winding turns disposed on the injection tooling are transferred along and into axially extending slots of the stator core, and wedges are placed in slots of the core. The core is moved from the injection station with winding turns thereon. Side turn portions of the winding turns are moved away from the bore of the core before the core is released by the core transfer assembly. The empty injection tooling is moved to an unloading station for transfer by the injection tooling transfer assembly from the indexing table to a shuttle means.

For stator cores of different heights or axial lengths, an adjustment is made which progressively adjusts equipment located at the wedge making and injection stations in accordance with movement of injection tooling that is to be employed with the stator core of a different axial length.

In accordance with other aspects of the invention, apparatus are disclosed for fabricating stator core assemblies. In one preferred embodiment described in more detail hereinbelow, a shuttle means having a matched set of parts comprising a slotted stator core and injection tooling supported at spaced apart locations thereon is moved toward a first coil winding station. A mechanism such as, for example, a first fetching assembly located at the winding station engages and moves the shuttle means so as to position or align the shuttle means at the station thereby positioning the injection tooling underneath a winding heat of a coil winding machine. A clamping assembly clamps a tool receiver supporting the injection tooling to position the injection tooling relative the winding head. A first indexing mechanism including a homing device rotates the injection tooling to a home position and then cooperates with the winding machine to index the tooling for disposing winding turns developed by the winding machine at predetermined locations of the tooling. After winding turns have been developed and disposed on the injection tooling at the first winding station, the injection tooling is released and moved to a second winding station which receives, positions, aligns and manipulates the tooling in the same manner as the first winding station to dispose additional winding turns on the tooling.

The shuttle means is moved from the second winding station to a transfer station. A second fetching assembly at the transfer station engages and moves the shuttle means to position the injection tooling relative to an injection tooling transfer assembly. A homing device rotates the tooling to an aligned receiving position relative the tooling transfer assembly, whereupon the tooling transfer assembly engages and transfers the injection tooling from the shuttle means to a wedge guide housing attached to an indexing table of a turntable arrangement.

The indexing table rotates to position and align the injection tooling at a first wedge making station, whereupon insulating wedges contained in a wedge magazine are inserted into wedge guides of the wedge guide housing. The indexing table then moves the tooling to a second wedge making station where additional insulating wedges are inserted into the wedge guide housing. The injection tooling is then moved and aligned with an injection machine at an injection station.

An adjustment arrangement is provided for rapidly performing machine set-up for the wedge making and injection operations. The adjustment arrangement adjusts wedge makers at each wedge making station to fabricate insulating wedges with a length appropriate for the axial length of the core. Further, the adjustment arrangement adjusts the injection mechanism at the injection station so that the insulating wedge and winding turn insertion operation is in accordance with the axial length of the core.

The slotted stator core is removed from the shuttle means to a core holder on a core transfer assembly. The core holder retains the core in a position so as to assure subsequent alignment with the injection tooling. The core transfer assembly also includes a blade aligner to assure alignment and clamping mechanism to retain the core in the aligned position. The core transfer assembly moves the core to the injection station and into an interfitting relationship with the injection tooling. An injection mechanism then moves injection tooling blades and a stripper through the bore of the core to transfer the winding turns along and into the axially extending slots of the stator core.

After winding turn insertion, the core transfer assembly is returned to its home position where an end turn separator operates to move end turns of the winding turns away from the bore of the core. The indexing table moves the injection tooling to an unloading station where the injection tooling transfer assembly engages and moves the tooling to a shuttle means.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views wherein:

FIG. 2 is a perspective view of injection tooling usable in the system of FIG. 1;

FIG. 3 is a cross-sectional view of the injection tooling of FIG. 2 illustrating latching engagement of a tooling stripper and injection rod of an injection mechanism;

FIG. 4 is a bottom view of the injection tooling illustrating blade spacing and grooved or channel outer blade surface configuration;

FIG. 5 is a perspective view of a shuttle tray usable in the system, and shows core receiver and tooling receiver details;

FIG. 6 is a cross-sectional view of the shuttle tray illustrating clamping bar mounting details;

FIG. 7 is a perspective view of a fetching assembly, a clamping assembly and an indexing mechanism from the system of FIG. 1;

FIG. 8 is a plan view of the fetching assembly illustrating mounting and control details;

FIG. 9 is a side elevational view of the fetching assembly illustrating assembly operational interrelationship with the shuttle trays;

FIG. 10 is a plan view of an indexing mechanism and clamping assembly from the system, with a tooling receiver in position for manipulation by the assemblies;

FIG. 11 is a side elevational view with parts removed showing details of the clamping assembly and the indexing mechanism of FIG. 10, with the tooling receiver in position to be received and manipulated thereby;

FIG. 12 is a perspective view of the transfer station, turntable arrangement, injection tooling transfer assembly and core transfer assembly of the system;

FIG. 14 is a fragmentary side elevational view, partly in cross-section, of a gripper of the injection tooling transfer assembly, showing the gripper receiving the injection tooling;

FIG. 15 is a fragmentary side elevational view, partly in cross-section, of the gripper of the injection tooling transfer assembly, showing the injection tooling retained therein;

FIG. 20 is a front view of a portion of the stator height adjustment arrangement illustrating interconnection details between adjusting cables and an adjustment wheel employed to set up the wedge making and injection stations in accordance with the axial length of the core;

FIG. 21 is a side elevation of the portion of the stator height adjustment arrangement shown in FIG. 20, illustrating mounting and interconnection details;

FIG. 22 is a front view of a portion of the stator height adjustment arrangement employed to adjust a wedge maker for fabrication of insulating wedges in accordance with the axial length of the core as selected by the arrangement shown in FIGS. 20 and 21;

FIG. 23 is a side elevation of the portion of the stator height adjustment arrangement shown in FIG. 22 illustrating mounting and interconnection details;

DESCRIPTION OF THE PREFERRED EMBODIMENTS

Figure 1:
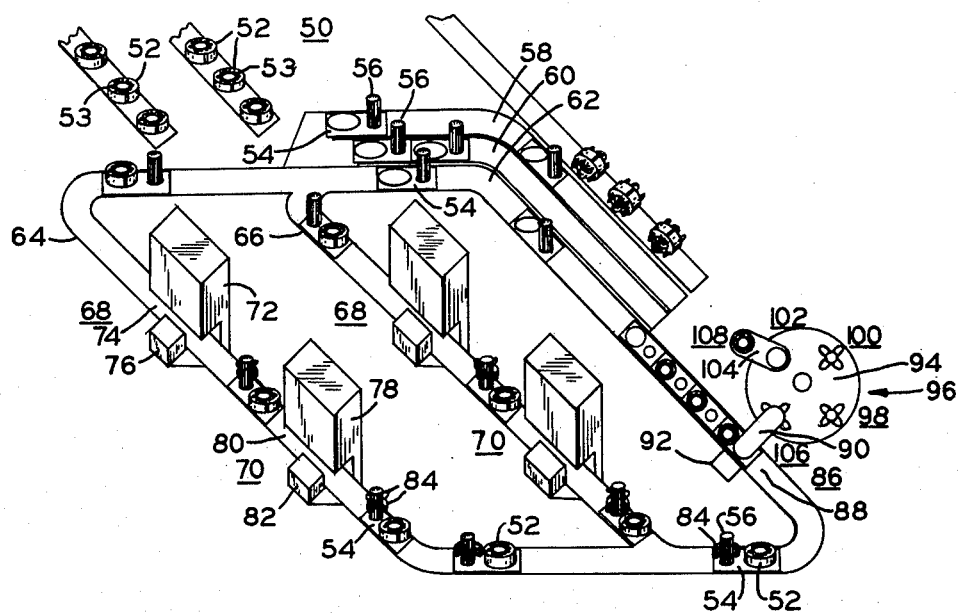
FIG. 1 is a schematic representation of a manufacturing system operable in accordance with and embodying teachings of the present invention in one form thereof.

Operation of an injection shuttle system embodying features of the present invention may be carried out in one form thereof as illustrated schematically by FIG. 1. At a selection station 50, one of the slotted magnetic cores 52 having axially extending slots 53 is selected and positioned on a shuttle means illustrated for purposes of exemplification as shuttle trays 54 each having injection tooling 56 which is utilized in subsequent operations. As illustrated, there are three different feed lines 58, 60, 62 for injection tooling at the selection station. The injection tooling of each line differ in that each can accommodate different wire sizes or different wire size combinations.

After a core is positioned on a shuttle tray having the particular tooling required to fabricate a desired stator assembly, the shuttle tray is moved to either of two winding lines 64 or 66. Each winding line is provided with two coil loading stations 68 and 70. The two lines are substantially identical in operation, thus for purposes of brevity, further detailed description presented herein is in terms of line 64.

The shuttle tray with the slotted core and injection tooling supported thereon is moved along winding line 64 to a first coil loading station 68 having a winding machine 72 of a known type such as, for example, disclosed in Cutler et al U.S. Pat. No. 3,672,026 which issued June 27, 1972 or Cutler et al U.S. Pat. No. 3,522,650 which issued Aug. 4, 1970 and which was reissued as U.S. Pat. No. Re. 27,415 on June 27, 1972, the entire disclosures of which are incorporated herein by reference except with the machine and forms being oriented so that winding turns are moved vertically downward into the injection tooling. The shuttle tray is engaged and moved into alignment at the first loading station by a mechanism in the form of first fetching assembly 74 so as to position or align the injection tooling underneath a winding head of the winding machine. The injection tooling is then manipulated by a first indexing device or assembly 76 (only general locations being depicted in FIG. 1) to move the injection tooling to a home position, align the tooling with the winding machine, and then perform incremental rotation of the tooling between predetermined index positions in order to dispose winding turns developed by the winding machine on the injection tooling.

After the winding turns have been developed and disposed on the tooling, the shuttle tray is pushed from the first coil loading station as the first fetching assembly engages and moves another shuttle tray into position at the coil loading station.

The shuttle tray is moved to the second coil loading station 70 having another winding machine 78. A second fetching assembly 80 and a second indexing device or assembly 82 are provided at the second coil loading station for performing identical functions as the first of such devices located at the first coil loading station. In one specific application, the first coil loading station may be employed to develop winding turns for a motor start winding and the second loading station may be used to develop winding turns for a main winding of the motor.

After winding turns have been developed and loaded into the injection tooling at the second coil loading station, the shuttle tray is pushed from the station as the second fetching assembly moves another transporting means into position.

The shuttle tray with the slotted core and injection tooling with winding turns 84 thereon is then moved to a transfer station 86.

At the transfer station, the shuttle tray is engaged by a third fetching assembly 88 to move the shuttle tray so as to position the loaded injection tooling relative to injection tooling transfer assembly 90. Once positioned, the injection tooling is manipulated by a homing device 92 to align the tooling relative the tooling transfer assembly. Once aligned, the tooling transfer assembly removes the injection tooling from the shuttle tray and positions the tooling within a means for accommodating the injection tooling in the form of a wedge guide housing located on an indexing support in the form of indexing table 94 of turntable arrangement 96.

After the injection tooling is loaded onto the indexing table, the table is rotated or indexed so as to move the tooling into an alignment position at a first wedge making station 98. Insulated wedges fabricated at this station are inserted into the wedge guide housing.

The injection tooling is then moved to a second wedge making station 100 by moving the indexing table where additional wedges are inserted into the wedge guide housing.

After the wedge making and insertion into the housing has been completed at the two wedge making stations, the injection tooling is then moved to an injection station 102 by moving the indexing table.

The slotted magnetic core which was conveyed along with the particular injection tooling to the transfer station is then removed from the shuttle tray and placed in an aligned position on a core transfer assembly 104. The core is then transferred by the assembly to the injection station and interfitted with the injection tooling. An injection mechanism of a known type such as, for example, disclosed in Hill U.S. Pat. No. 3,324,536 which issued June 13, 1967 or Smith U.S. Pat. No. 3,698,063 which issued Oct. 17, 1972, the entire disclosures of which are incorporated herein by reference, except with additions or modifications described hereinbelow, is then employed to transfer the winding turns from the tooling axially along and into axially extending slots of the core. After the winding turns have been transferred to the core, the empty injection tooling is moved by the indexing table to a tool unloading station 106 which in this embodiment is the same location as where the tooling was initially positioned on the indexing table. The injection tooling transfer assembly then removes the tooling from the wedge guide housing and positions it on a shuttle tray. The tooling transfer assembly could be simultaneously moving another loaded injection tool onto the indexing table.

The core with winding turns inserted in the slots thereof is moved by the core transfer assembly from the injection station back to a core unloading station 108 which in the system of FIG. 1 is at the same location as where the core was initially loaded on the transfer assembly. At the core unloading position, an end turn separator is activated to move end turns of the windings away from the bore of the core. Simultaneous with the removal of the core from the injection station, the core transfer assembly moves another core into position at the injection station and interfits this core with another loaded injection tool.

The core with the winding turns inserted therein and the end turns moved away from its bore is then conveyed away from the core unloading station.

The empty injection tooling, after being removed from the indexing table and positioned on a shuttle tray, is pushed away from the transfer station as the third fetching assembly moves another shuttle tray with loaded injection tooling thereon into position relative the tooling transfer assembly.

The shuttle tray with the empty tooling thereon is then moved back to the selection station for use with another slotted magnetic core and a repeat of the above-described operations.

FIGS. 2–4 further illustrate details of the injection tooling 56 employed with the present invention. As shown, the tooling comprises a plurality of blades 110 with each provided with a groove or channel type outer surface 112 and a pick-up recess 114 at the top portion thereof. The blades are attached to a blade pack base 116 which is provided with two angle portions 118, 120 with the angled portion 118 having alignment recess 122. The injection tooling also includes a stripper 124 slideably mounted within the blades. All the injection tooling employed with the equipment illustrated herein are essentially the same with the exception that openings 126 between each of the blades may be varied from one tool pack to another, depending on the wire diameter or the diameter of different wire combinations employed to produce the winding turns at the coil loading stations. As will be discussed hereinbelow, the pick-up recesses facilitate transfer of the tool pack on and off the indexing table and the groove surfaces allow interfitting of the slotted core with the tooling in that the grooves are sized such that stator core teeth slide therein. The stripper is slideably mounted within the blades in order to transfer the winding turns from the tooling into the core slots as will be subsequently discussed.

After selection, the injection tooling and core are placed in a supporting position on a shuttle means which is the shuttle tray 54 as shown in FIGS. 5 and 6. The slotted core is placed in core receiver 128 located on a first portion of the shuttle tray and the injection tooling is placed on tool receiver 130 located on a second portion of the shuttle tray. The tooling is placed over post 132 with aligning pin 134 being received in the alignment recess 122 of the angled portion 118 of the tooling base. A loose fit between the tooling and post may be provided, if desired, to aid centering of the injection tooling relative winding forms of a winding machine of a known type such as disclosed, for example, in the hereinabove referenced Cutler et al U.S. Pat. No. 3,672,026 or Cutler et al U.S. Pat. No. Re. 27,415. Movement of winding turns from forms of the winding machine onto the tooling would have a tendency to deflect loosely mounted tooling into an aligned and centered position relative the forms for compensating for radial and/or transverse misalignment of the tooling blades relative the winding forms caused by such things as differences between different injection tooling or out of tolerance elements of the winding machine. The post is mounted for rotation, by way of gear 136, on clamping block 138 which is in turn loosely mounted to the tray base by way of four brackets 140 and pins 142 so as to allow movement between the brackets when clamping force is applied. Loose mounting of the clamping block provides means for compensating for variances in fabrication between the different shuttle trays and for variances in the conveyor on which the trays are moved, thus allowing clamping of the tool receiver at the various operating stations as discussed hereinbelow. The clamping block has four clamping pins 144 mounted therein for interfitting with clamping assemblies at coil loading and transfer stations. The tool receiver also includes end turn protecting plate 146 attached to the gear by three mounting posts 148 and a home switch block 150 also attached to the gear for assuring proper rotational orientation of the tooling at the coil loading and transfer stations as will be discussed hereinbelow. In order to allow engagement by the fetching assemblies for movement into position at these stations, the shuttle tray is provided with an aperture 152.

After the core and tooling have been positioned thereon, the shuttle tray is moved to the first coil loading station 68. As mentioned previously, the shuttle tray is engaged at the first coiling station by a first fetching assembly which moves the tray so as to position the injection tooling underneath a winding head of the winding machine 72. Once in position, the tooling receiver is clamped, rotated to a home position and then indexed to dispose winding turns, developed by the winding machine, on the tooling.

The fetching assemblies employed at the different stations are of the same type, thus for brevity, only one (the first fetching assembly 74) will be described. Referring to FIGS. 7–9, the fetching assembly includes a hydraulic motor 154 for operating a crank arm 156 which moves bottom and top slides 158 and 160 along rails 162. As the slides are moved, fetch pin 164 is cammed upward into the aperture of the shuttle tray, thus engaging the tray for movement of the injection tooling by the first fetching assembly into position underneath the winding head of the injection machine. As the tooling is moved into position, the fetch pin is cammed downward, thus disengaging the tray allowing the fetching assembly to recycle or return to engage another shuttle tray and move it into position once the winding turns have been disposed on the injection tooling previously positioned underneath the winding head.

As illustrated by FIGS. 7–9, the crank arm 156 is attached to the bottom slide 158 for causing movement thereof. The top slide 160 is slidably mounted within the bottom slide and is provided with latches 166 and 168 pivotally mounted by way of pins 170–172, respectively for alternately engaging the bottom slide in order to prevent relative movement between the two slides during movement along the rails 162. The fetch pin 164 is slideably retained within the top slide with its base portion 174 moveable along cam surface 176 of the bottom slide for camming in and out of engagement with the shuttle trays.

In operation, the hydraulic motor is activated to move the crank arm to "fetch" the shuttle tray 54 as shown in FIG. 9. The crank arm moves the bottom slide 158 along the rails 162 in direction 178. During this movement, the latch 168 of the top slide 160 is engaged with the bottom slide and the latch 166 is disengaged from the bottom slide. As the slides approach the tray pick-up position, roller 180 engages the latch 168 disengaging it from the bottom slide and stop bolts 182 engage the top slide stopping its movement. However, the bottom slide continues to move with this relative movement between the two slides causing the fetch pin 164 to move upward along the cam surface 176 and into engagement with the shuttle tray aperture 152 and causing latch 166 to engage the bottom slide as illustrated in FIG. 9.

After the shuttle tray is engaged, the fetching assembly crank arm moves the shuttle tray toward the winding head by moving the slides along the rails in direction 184. This movement of the tray into position simultaneously causes the tray previously underneath the winding head to be pushed from the coil loading station. Continued movement of the tray causes roller 186 to engage the latch 166 of the top slide disengaging it from the bottom slide and causes stop bolts 188 to engage and stop further movement of the top slide. The crank arm continues to move the bottom slide with this relative movement between the two slides causing the fetch pin to cam downward along the cam surface 176 to move the pin out of engagement with the shuttle tray, thus releasing the tray at a position such that the injection tooling thereon is underneath the winding head of the winding machine. The stroke of the crank arm is controlled by deenergization of the hydraulic motor by limit switch 190 which is actuated by recessed cam surface 192 of the crank arm assembly. Valve 194 is also actuated by the recessed cam surface to cause operation of clamping assembly 196 for retaining the injection tooling in position underneath the winding head. If another shuttle tray is in a "fetch" position, the hydraulic motor is again energized to cause the slides and fetching pin to move in the reverse direction for engagement with the next shuttle tray.

In order to move the shuttle tray into a proper position for engagement by the fetching assembly, conveyor 198, along which the trays are moved, is sloped so that incoming shuttle trays stop in the proper pick-up position. Of course, other provisions could be provided to accomplish this positioning of incoming trays such as cylinder operated stops (not shown) which would engage each incoming tray and then be released when the fetching assembly is ready to move the particular shuttle tray into position at the winding machine.

In order to assure that the injection tooling is in the pick-up position and is of a proper height, a magnetic switch unit 200 and a vane assembly 202 are provided as illustrated in FIG. 7. Movement of a shuttle tray into the pick-up position for the fetching assembly causes pivotally mounted flap 204 of the vane assembly to be engaged and pivoted by the injection tooling. The flap in turn causes vane 206 to move within the magnetic switch unit, thus allowing fetching assembly operation. On the other hand, if injection tooling is not on the shuttle tray or is of an improper height, the vane will not be moved a sufficient distance or will be moved beyond the magnetic switch unit, thus preventing fetching assembly operation. This provision can also be used to stop the feeding of injection tooling at a certain point if desired by the placement of tooling of improper height tooling on a tray wherein it is desired to stop operation.

After the first fetching assembly has moved the injection tooling into position underneath the winding head of the injection machine at the first coil loading station, the clamping assembly 196 illustrated in FIG. 7 is activated by the valve 194 to clamp the tool receiver of the shuttle tray by moving its jaws 208 inwardly so as to cause the clamping pins of the tool receiver to be received within recesses 210 of the jaws.

FIGS. 10 and 11 illustrate the details of the clamping assembly and an indexing assembly 212. In order to clamp the tool receiver 130, double acting clamping cylinder 214, which is interconnected to the two jaws 208 by way of arm 216 and linkages 218, is activated which in turn causes the jaws to move inwardly to interfit the clamping pins 144 of the tool receiver within the recesses 210 of the jaws. The arm actuates limit switch 220 to indicate that the clamping jaws have been closed.

The clamping jaw movement to cause clamping of the tool receiver also activates the indexing assembly to move chain 222 into engagement with the gear 136 of the shuttle tray. The chain is interconnected for movement by driving motor 224 by way of gears 226 and driving gear 228. When the chain engages the tooling receiver gear, the driving motor is activated to rotate the injection tooling to a home position as indicated by the home switch block 150 engaging home limit switch 230. Upon actuation of home limit switch, pinion gear 232 is moved downwardly by cylinder 234 to cause simultaneous engagement of index gear 236 and gear 238. The gear 238 is attached to the driving gear 228 by pin 240; thus, the downward movement of the pinion gear interconnects the indexing gear and the driving gear.

As illustrated in FIGS. 10 and 11, the index gear has an index plate 242 attached thereto. This plate functions to control rotational position of the injection tooling relative to the winding head of the winding machine. Four index blocks 244 are attached to the index plate with the blocks alternating in height. The index plate is also provided with four stop recesses 246 for receiving stop pin 248 operated by stop cylinder 250. Thus, in operation, the sliding pinion gear moves down to cause interconnection of the driving and index gears. The driving motor then rotates the index gear until one of the index blocks engages either or both limit switches 252 and 254. Once engaged, the stop cylinder is activated to move the stop pin within one of the stop recesses of the index plate to lock the index plate and thus the injection tooling in position. Once positioned and locked, the winding machine is activated to cause coils to be developed on its winding head and loaded onto the injection tooling. The direction of winding is determined by the two limit switches 252 and 254. If both are activated by one of the switch blocks, the winding will be in one direction; however, if a short switch block is encountered, only the limit switch 252 will be activated, thus signaling the winding machine to develop coils wound in an opposite direction.

After the coils, each comprising a predetermined number of winding turns, have been developed at the index position, the driving motor is again activated to move the index gear and plate to another index position, whereupon additional coils are developed by the winding machine and loaded onto the injection tooling. After all the indexing and winding has been performed, the clamping assembly releases the tooling receiver.

After the tooling receiver is released by the clamping assembly, the first fetching assembly moves another shuttle tray into position underneath the winding head of the winding machine. This movement of another shuttle tray pushes the shuttle tray underneath the winding head away from the first coil loading station. The shuttle tray with stator core and injection tooling having winding turns thereon is then moved to the second coil loading station 70 (illustrated in FIG. 1). The second coil loading station is provided with a second fetching assembly, a second clamping assembly, and second indexing assembly for performing substantially the same operations as those performed at the first loading station. Thus, the second winding machine develops additional coils comprising winding turns and loads these coils onto the injection tooling. After these additional coils have been developed and loaded onto the injection tooling, the tooling receiver is released and then the second fetching assembly moves another shuttle tray into position causing the tray with loaded tooling thereon to be pushed from the second coil loading station.

The shuttle tray 54 with the core 52 and injection tooling 56 having winding turns 84 thereon is moved from the second coil loading station to the transfer station 86 illustrated in FIG. 12.

Referring to FIG. 12, the shuttle tray is moved into position underneath the tooling transfer assembly 90 by the third fetching assembly 88 which is of the same type as the previously discussed first and second fetching assemblies (see FIGS. 7-9). The tooling receiver is then clamped by a third clamping assembly 256 which is of the same type as the first clamping assembly (see FIGS. 10, 11) located at the first coil loading station. A homing device generally designated by reference number 258 which is of the same type as the homing portion of the first and second indexing devices (see FIGS. 10, 11), is then activated to rotate the injection tooling into an aligned position for pick-up by the tooling transfer assembly.

The transfer assembly is activated causing its pick-up arm 260 to move downwardly to interfit and pick up the loaded injection tooling with winding turns 84 thereon and the empty injection tooling within wedge guide housing 262. The pick-up arm is then retracted and pivoted to align the loaded injection tooling with the wedge guide housing 262 attached to the index table 94. The arm is again moved downwardly to slideably position the loaded tooling within the wedge guide housing and to position the empty tooling on the shuttle tray from which the loaded tooling was removed.

Figure 13:
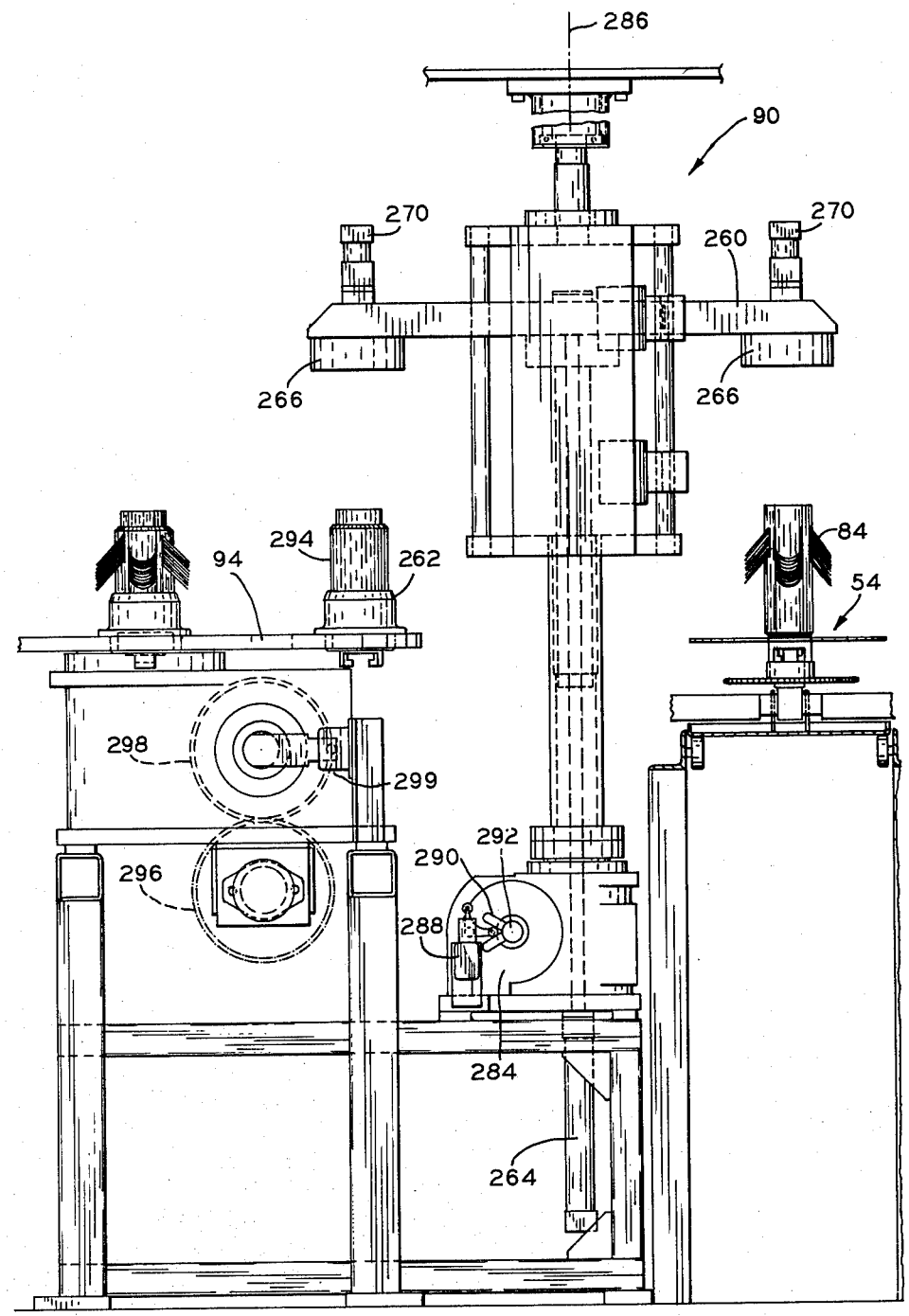
FIG. 13 is a partial side elevation, with parts removed, of the injection tooling transfer assembly and injection tooling in position for transfer by the assembly.

FIGS. 13-15 illustrate further details of the tooling transfer assembly 90. In FIG. 13, the transfer assembly is shown with the pick-up arm 260 in the retracted position ready to pick up both the empty injection tooling located on the index table within the wedge guide housing 262 and the loaded injection tooling with winding turns 84 thereon located on the shuttle tray 54 in order to transfer the loaded injection tooling onto the index table and simultaneously remove the empty injection tooling from the table. In effecting the transfer, arm cylinder 264 is activated to move the pick-up arm 260 downward so that two tool grippers 266, located on each end portion of the arm, move slideably over and in an interfitting relationship with the empty and loaded injection tooling. This movement of the grippers over the injection tooling is illustrated by FIGS. 14 and 15 which show details of one of the grippers. Both grippers are identical, thus the details and operation of only one will be described. In operation, as the arm of the tooling transfer assembly is moved downward to pick up the injection tooling, the gripper is in a receiving position as illustrated in FIG. 14. The gripper is moved downward causing its member 268, which is similar in structure to the injection tooling stripper, to move slideably within the interior of the blades 110. Cylinder 270, which is interconnected with cam members 272 by way of plate 274 and bolt 276, is then deactivated allowing spring 282 to move the cam downward causing locking pins 278 to move along cam surface 280 and thus, outwardly into the pick-up recesses 114 of the injection tooling blades as illustrated in FIG. 15. The member 268 prevents flexing of the blades, thus assuring positive locking by the pins. The spring 282 mounted on the bolt 276 biases the cam so that the gripping means is in a gripping position when the cylinder is not activated.

Referring to FIG. 13, after the two tool grippers have gripped or locked both the empty and loaded injection tooling in place by way of the locking pins, the arm cylinder 264, is operated to move the pick-up arm 260 upwardly with the injection tools gripped thereon. Hydraulic motor 284 is then activated to rotate the pick-up arm about vertical axis 286 with the rotation travel distance being controlled by limit switch 288 actuated by switch actuator 290 attached to the hydraulic motor shaft 292 in order to position the empty injection tooling over the shuttle tray 54 and to position the loaded injection tooling over the wedge guide housing 262 attached to the index table. The arm cylinder is again operated to move the tooling downwardly, thus positioning the loaded tooling slideably within wedge guides 294 of the wedge guide housing 262 and simultaneously positioning the empty tooling on the shuttle tray. Each wedge guide is provided with an angle portion (not shown) at its base which extends inwardly toward the center of the wedge guide housing; thus, the injection tool is prevented from sliding through the housing by the wedge guides. The cylinders 270 of the grippers 266 are then again activated to move their respective cams 272 upwardly (see FIG. 14), thus causing the locking pins 278 to move out of engagement to release the toolings. Once released, the arm cylinder is again operated to move the arm upwardly without the injection toolings.

After the loaded injection tooling has been positioned on the index table 94, the table is indexed or rotated in 90 degree increments by motor 296 connected to an intermitter gear drive arrangement 298 (shown in FIG. 13), with attached vane and reed switch arrangement 299 for correct alignment of the injection tooling at the two wedge making stations 98, 100, the injection station 102 and the unload station 106 (see FIG. 12).

Figure 16:
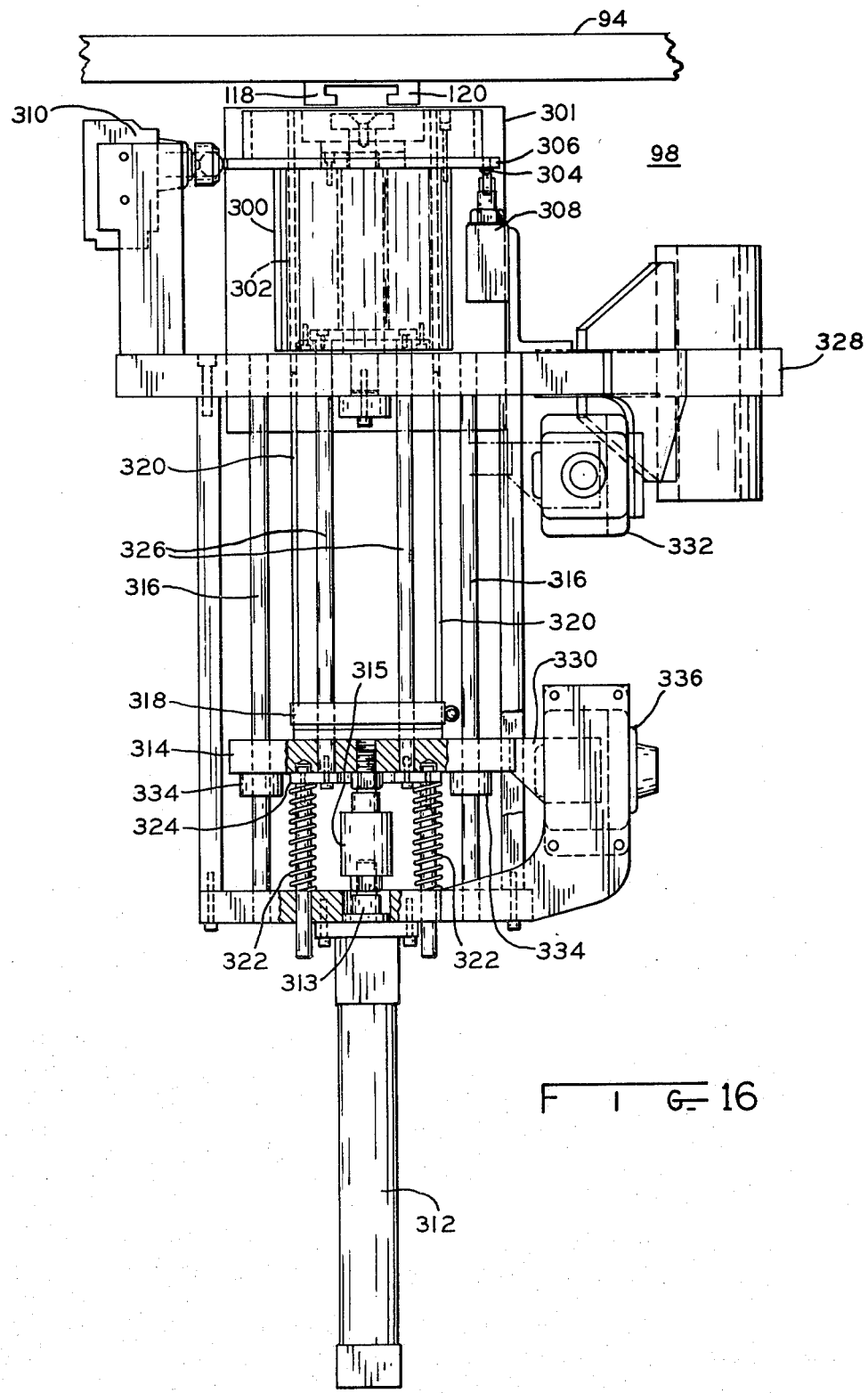
FIG. 16 is a side elevation of a first wedge making station, illustrating mounting and control details for fabrication and insertion of insulating wedges into wedge guides of a wedge guide housing.

Referring to FIG. 16, the index table 94 is initially rotated 90 degrees to the first wedge making station 98. During movement of the index table, wedge magazine 300 is at a lowered position as shown in FIG. 16 to provide clearance with the injection tooling locking means or angled portions 118, 120 (see FIG. 2). Insulating wedges (not shown) are fabricated by a known wedge maker 301 such as, for example, taught in Arnold et al U.S. Pat. No. 3,579,818 which issued May 25, 1971, the entire disclosure of which is incorporated herein by reference. The insulating wedges are inserted into wedge holders 302 of the wedge magazine. In the wedge making operation, the wedge magazine is indexed relative the wedge maker. Screws such as screw 304 are attached to wedge magazine plate 306 opposite each wedge holder where an insulating wedge is to be inserted. As the wedge magazine is rotated, the screws actuate limit switch 308 to stop feed of the wedge material for fabrication and insertion of insulating wedges into the proper wedge holders. Ball operated limit switch 310 is actuated after a complete rotation of the wedge magazine, thus indicating that a home position has been reached.

After the injection tooling 56 (only tooling angled portions 118, 120 illustrated in FIG. 16) is in proper alignment position at the first wedge making station 98, pusher cylinder 312 is operated to cause pusher plate 314 attached to cylinder rod 313 by coupling arrangement 315 to move upwardly along guide rods 316. Platen 318 attached to the pusher plate and having wedge pushers 320 attached therein is also moved upwardly with the pusher plate. As the pusher cylinder operates to move the pusher plate upwardly, compression on two springs 322 is thereby relieved causing plate 324 and rods 326 attached thereto to be moved upwardly with rods 326 slideably moving within fixed support 328. This upward movement of the rods 326 moves the wedge magazine 300 attached to the rods into position adjacent the index table 94 with the wedge holders 302 being in alignment with the wedge guides 294 (see FIG. 12) of the wedge guide housing 262. The cylinder continues to move the pusher plate and platen upward, thus moving the wedge pushers slideably through the fixed support 328 and through the wedge magazine. Insulating wedges (not shown) contained within the wedge holders of the wedge magazine are moved upwardly by the wedge pushers into the wedge guides of the wedge guide housing. Vane 330 attached to the pusher plate is moved to the position shown by the broken lines to actuate magnetic switch 332, thus indicating that the cylinder rod 313 has extended to insert the insulating wedges.

After the wedges have been transferred to the wedge guides, the pusher cylinder 312 is operated to retract its cylinder rod 313 to the position shown in FIG. 16 with the pusher plate 314 resting against stops 334 attached to the guide rods 316. Magnetic switch 336 is actuated by the vane to indicate that the pusher cylinder rod is fully retracted. The two springs 322 are again compressed by the pusher plate, thus causing the wedge magazine to be moved to the "down" position in order to provide clearance with the angled base portions 118, 120 of the injection tooling.

Referring to FIG. 12, the index table 94 is then rotated or indexed to the second wedge making station 100 for insertion of additional insulating wedges into the wedge guides 294. The second wedge making station is provided with identical elements as those described above for the first wedge making station 98 and also operates in the same manner as the first wedge making station.

After additional insulating wedges have been inserted at the second wedge making station, the index table is indexed or rotated another 90 degrees to move the loaded injection tooling from the second wedge making station to the coil injection station 102. At the injection station, the respective stator core 52 which was transferred in the same shuttle tray 54 as the loaded injection tooling is interfitted with the tooling. The winding turns 84 are then injected or transferred from the injection tooling into the axially extending slots 53 of the stator core.

The core transfer assembly 104 illustrated in FIG. 12 is provided for transferring the respective stator core into the interfitting relationship with the injection tooling at the coil injection station 102. For illustration purposes, the core transfer assembly is shown in FIG. 12 with its arm 342 in the "up" position with one of the stator cores 52 thereon. Two core holders 338, 340 located at each end of the arm 342 allow removal of a core from the injection station after winding turns have been inserted into slots of the respective core simultaneously with the transfer of another core into position at the injection station. In order to assure proper alignment of the cores and thus assure that the cores do interfit properly with the injection tooling, each core holder is provided with alignment pins 344 which interfit with recesses 345 of each core. In addition, cylinder operated blade aligners 346, 348 which operate independently of each other are provided to further assure proper core alignment with the injection tooling and to assure proper alignment of the injection tooling blades 110 (see FIG. 3) at the injection station. Core alignment is provided by keys 347 of the blade aligners which interfit between adjacent teeth 349 of a core, that is, within the open ends 351 of the slots at the bores 353 of the cores. Blade alignment of the injection tooling is provided by recesses 355 of the blade aligners which receive the blades of the injection tooling at the injection station. To retain this alignment, two cylinder operated clamps 350, 352, which also operate independently of each other, are provided with the clamps also functioning to retain the core during injection of the winding turns 84 and during movement of injected winding turns away from the bore of the core by cylinder operated end turn separator 354.

The operation will be described with reference to FIGS. 12, 17 and 18. Referring initially to FIG. 12, the arm cylinder 360 (see FIG. 17) is activated to move arm 342 to a "down" position from the "up" position as shown in FIG. 12. The respective one of the stator cores 52, which was transferred in the same shuttle tray with the injection tooling located at the second wedge making station 100, is removed from its shuttle tray and placed in the core holder 338 while the arm is in the down position. Core alignment is assured because the alignment pins 344 must be received in corresponding recesses 345 of the core. A gate (not shown) is then closed around the core loading area. After the gate is closed, one of the two clamp cylinders 356 is energized to move the core clamp 350 downward around the periphery of the core to retain the core in position. One of the two blade aligner cylinders 358 is then energized to move the blade aligner 346 downward and slideably into the interior bore of the core. The arm cylinder 360 (see FIG. 17) is then operated to raise the arm 342 with the respective stator core thereon to a full "up" position. The index table 94 is indexed 90 degrees to move the respective injection tooling to the injection station 102. Referring to FIG. 18, motor 362 is energized after the core assembly arm has reached its full "up" position, causing the arm to pivot for moving the core into an aligned position over the injection tooling located at the injection station. Limit switches 364, 366 are employed to stop the motor at this aligned position with both limit switches being actuated by block 368 attached to gear 370 when one of the core holders is in position over the injection tooling and with shorter block 372 also attached to the gear causing actuation of only the limit switch 364 when the oppositely disposed core holder is over the tooling at the injection station.

Figure 17:
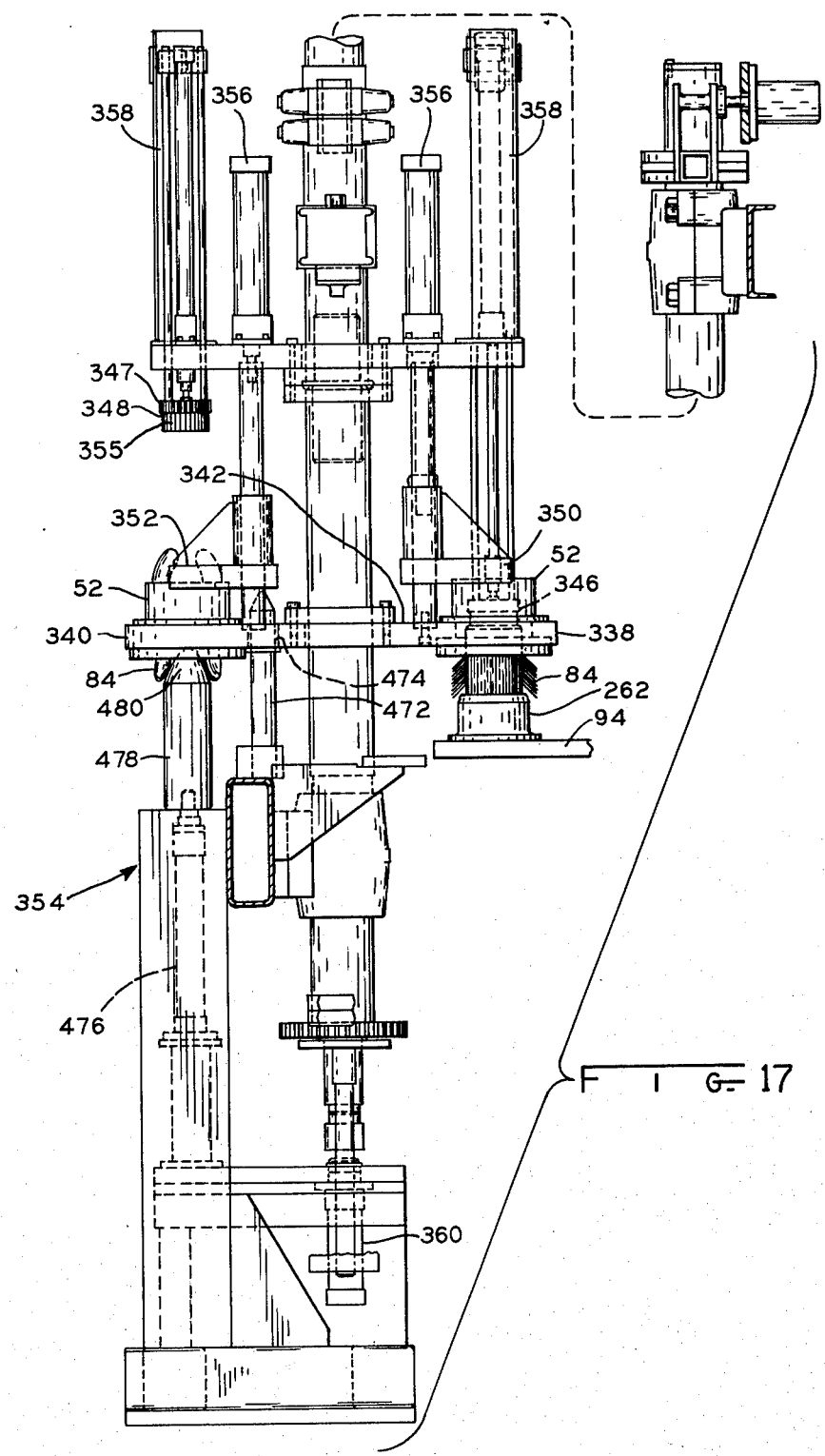
FIG. 17 is a side elevation, with parts removed, of the core transfer assembly and an end turn separator, showing mounting details and injection tooling positioned on the index table at the injection station.
Figure 18:
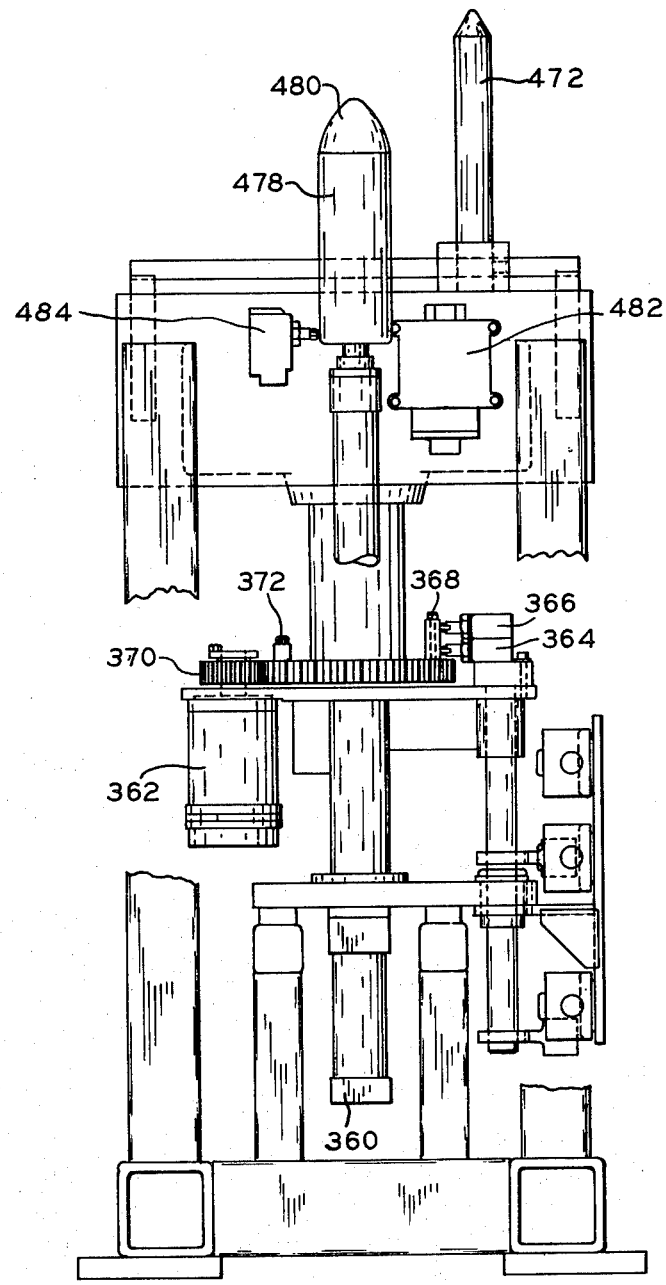
FIG. 18 is a fragmentary side elevation with parts removed, of the end turn separator and core transfer assembly illustrating separator controls and rotational control details for the core transfer assembly.

After rotating the arm 342 so that the empty stator core within core holder 338 is in position over the tooling at the injection station, the arm cylinder 360 is deenergized to move the arm downward to the position as illustrated in FIG. 17. As illustrated, the stator core within stator holder 340 which was previously at the injection station is now positioned over end turn separator 354 with its respective winding turns 84 accommodated in slots thereof; whereas, the empty stator core within core holder 338 has been interfitted or moved slideably over its respective injection tooling 56, also having winding turns 84 disposed thereon. During lowering of the arm, the respective blade aligner cylinder 358 is moved to a neutral position in order to allow the blades of the injection tooling to push them upward during the interfitting operation and during the injection cycle described hereinbelow.

Figure 19:
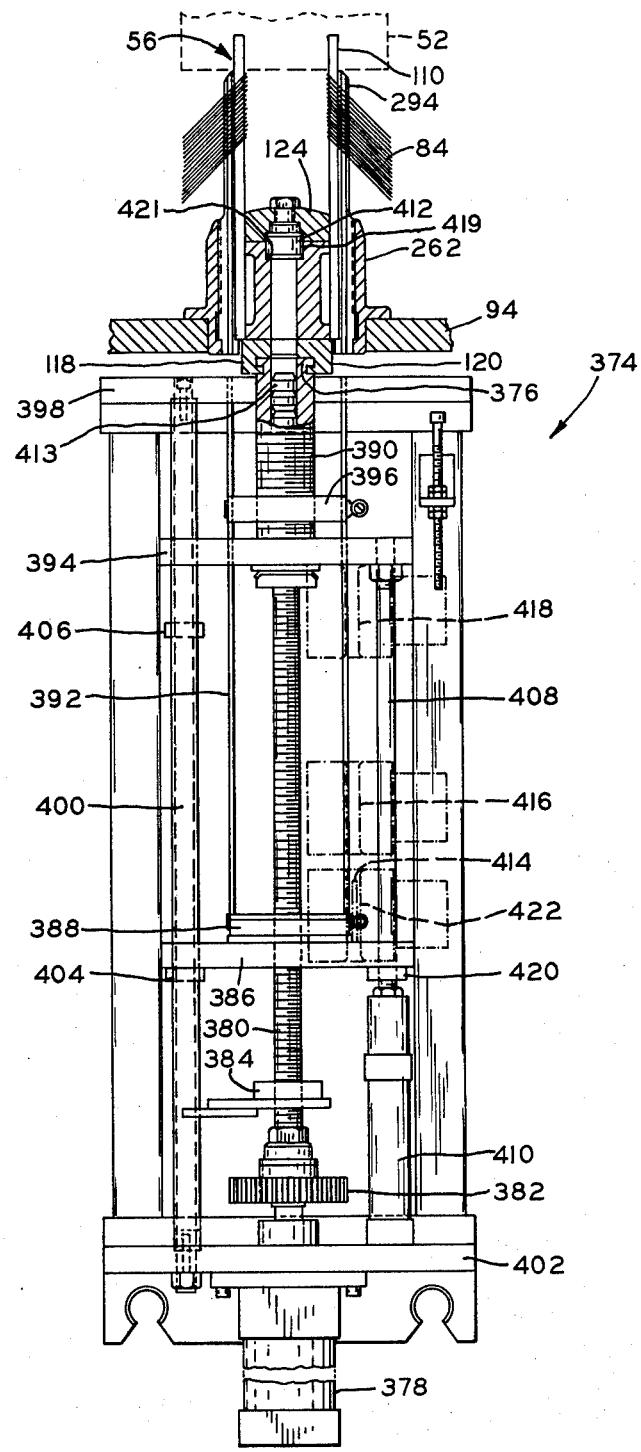
FIG. 19 is a side elevation, partly in cross-section, of the injection mechanism at the injection station showing the injection tooling in position for effecting a transfer of insulating wedges and winding turns from the tooling to a stator core.

FIG. 19 shows the respective stator core 52 (illustrated with broken line) in position over the injection tooling 56 (shown in cross-section) at the injection station. The clamp 350 (see FIG. 17) retains the core in position over the tooling and the blade aligner 346 (see FIG. 17) is positioned within the core. An injection mechanism 374, located at the injection station is employed to transfer the winding turns 84 from the injection tooling into the axial extending slots of the stator core. The injection tooling 56 having blades 110 and stripper 124 (shown in cross-section) is locked into an align position by its angled base portions 118, 120 being received in flange portion 376 of the injection mechanism.

After the core is interfitted with the tooling, the injection mechanism is activated to transfer winding turns from the tooling into the axial extending slots of the core. In performing the insertion, the blades of the injection tooling are moved upward and slideably through the interior bore of the core with the outer grooves of the blades sliding along the teeth of the core. The blade travel distance is varied in accordance with the axial length or stack height of the core. The insulating wedges previously fabricated at the first and second wedge making stations 98, 100, respectively (see FIG. 12) are also moved upward by wedge pushers 392 through the wedge guides 294 and into the slots of the core with the travel of the wedge pushers also being varied in accordance with stack height. Following the insulating wedges are the winding turns which are moved upwardly by the stripper 124 along the tooling blades and axially along and into the slots of the core.

Details of the injection mechanism are illustrated in FIG. 19 and details of the core height adjustment arrangement are illustrated in FIGS. 20–25. Referring to FIG. 19, injection cylinder 378 having injection rod 380 is provided for moving the stripper 124 along the interior of the blades 110 and thus, stripping or transferring the winding turns 84 disposed on the blades from the blades into the axial slots of the core 52. The injection rod is provided with height adjustment gear 382 and has wedge adjustment flange 384 threaded thereon. The injection rod extends slideably through push plate 386, pusher platen 388 and sleeve 390. Wedge pushers 392 are attached at one end thereof to the pusher platen which is attached to the push plate. The pushers extend slideably through plate 394, support ring 396 and frame support 398. The plate 394 and the push plate are slideably mounted on guide rods 400 attached at each end thereof to frame supports 398 and 402 with the push plate moving between stops 404 and 406 mounted on the rods. The plate 394 is engaged by cylinder rod 408 of blade cylinder 410 and also is threadably engaged with the sleeve 390.

In operation, the injection cylinder 378 and blade cylinder 410 are activated simultaneously. The injection cylinder rod 380 moves upward causing the wedge adjust flange 384 to engage the push plate 386. The push plate then moves upward away from the stop 404 and pushes the pusher platen 388 upward which causes the pushers 392 to move to the tips of the wedge guides 294 and thus push the insulating wedges (not shown) from the guides into the slots of the core. The blade cylinder rod 408 pushes the plate 394 upward which causes the sleeve 390 to move upward. The sleeve is moved until the pusher support ring 396 abuts the frame support 398; thus the blades of the injection tooling are moved upward within the interior bore of the core to the height or axial length of the core. The blades push the blade aligner 346 (see FIG. 17) upward as they move within the bore.

The injection rod continues to move upward and engages the stripper. Engagement is accomplished by providing the stripper with a push-pull type connector socket 412, one of which that has been used being a Hansen "PUSH-TITE" series 3000 manufactured by the Hansen Manufacturing Company under that tradename, except with the check valve usually contained therein being removed. As the injection rod is moved into the socket, pins or balls (not shown) within the socket are moved inwardly to engage recess portion 413 of the injection rod. A vane 414 attached to the push plate actuates magnetic switch 416 (vane position shown in broken line) causing the respective one of the blade aligner cylinders 358 (see FIG. 17) to be moved from a neutral position to a position for retracting the blade aligner. As the stripper 124 is moved upwardly, the winding turns 84 contained on the blades 110 are stripped or transferred from the blades into the axial extending slots of the core. This upward movement of the stripper continues until the push plate engages the stop 406. Magnetic switch 418 is actuated by the vane 414 attached to the push plate, thus indicating full extension of the injection cylinder rod 380.

After the winding turns and insulating wedges have been inserted into the slots of the stator core, the injection cylinder 378 and blade cylinder 410 are retracted causing the injection rod 380 to pull the stripper back through the interior of the blades and the blades back to their retracted positions within the wedge guide housing. The collar 419 of the socket 412 engages surface 421 of the tooling causing the pins or balls (not shown) located within the socket to move outwardly to disengage the injection rod, thus allowing full retraction of the injection rod with the push plate abutting the stop 404 and nut 420 attached to the blade cylinder rod. Magnetic switch 422 is activated by the vane 414 indicating that the injection cylinder rod has been fully retracted.

As mentioned previously, the injection mechanism 374 of FIG. 19 is adjusted in accordance with the height or axial length of the particular stator core during set-up of the machine. Further, the wedge makers at each of the two wedge making stations 98 and 100 (see FIG. 12) are also adjusted to fabricate insulating wedges with an axial length appropriate for stator cores of a particular height or axial length. The adjustment is performed progressively in order to assure adjustment at the proper time corresponding to the sequential movement of the injection tooling to the stations. For example, referring to FIG. 12, an adjustment for a different core height would be made when the injection tooling to be used with the core of a different height is transferred to the indexing table 94. The first wedge making station 98 would in turn delay fabrication of insulating wedges of a proper length until the tooling is moved into position at the first wedge making station. In a like manner, the second wedge making station 98 and the injection station 100 would delay adjustment for the different core height until the injection tooling to be used with the core of a different height is being moved into position at the respective stations. The sequential control of the stator height adjustment and the entire turntable and transfer arrangements illustrated in FIG. 12 can be accomplished by a known programmable controller or computer such as, for example, a TI 102 Sequencer manufactured by the Texas Instruments Corporation.

FIGS. 20–25 illustrate details of a stator height adjustment arrangement which is interconnected with the turntable arrangement for accomplishing adjustment of the wedge makers and injection mechanism in accordance with the axial length of the stator core. To perform the adjustments, adjustment wheel 424, attached to adjustment screw 426 as illustrated in FIGS. 20 and 21 is rotated with such rotation causing movement of adjustment cables or linkages 428, 430, 432 which are interconnected for movement by the adjustment screw by way of sleeve 434 and plate 436. The adjustment screw is rotated until index pointer 438 attached to the plate is aligned with the particular core height graduation contained on index plate 440 which is marked or graduated in accordance with different stator heights. The illustrated index plate or scale is graduated from zero to six inches.

FIGS. 22 and 23 illustrate an arrangement for adjusting the length of insulating wedges in accordance with the axial length of the stator core. The adjustment arrangement is identical for both wedge making stations, thus only the arrangement for the first wedge making station is illustrated. The length of the insulating wedges is determined by the position of wedge linkage 442 which is connected to the wedge maker 301 (see FIG. 16).

The linkage 442 may be employed to vary the wedge length fabricated by the wedge maker of a known type such as disclosed in the hereinabove referenced and incorporated Arnold et al U.S. Pat. No. 3,579,818 by, for example, varying the location of either pivot point 74 or pivot point 94 shown in FIG. 2 of the referenced patent. The linkage position is controlled by cylinder 444 which has its cylinder rod 446 connected to the linkage and switch vane 448 by way bar 450. The vane which is slideably mounted on rod 452 causes actuation of magnetic switch 454 slideably mounted on rods 456 and connected to the adjustment cable 430.

The operation of the wedge adjustment arrangement will be described in reference to FIGS. 22 and 23. Rotation of the adjustment wheel 424 (see FIG. 20) causes the cable 430 to adjust the relative position of the magnetic switch 454 on the rods 456. The cylinder 444 is then energized in order to adjust the position of the wedge linkage 442 so that insulating wedges will be fabricated in accordance with the stator height as set by the adjustment wheel. The wedge linkage is moved by the cylinder until the vane 448 causes actuation of the magnetic switch. In order to assure more accurate and repeatable adjustments, the cylinder rod is initially retracted and then extended so that the vane approaches the switch in the same direction each time an adjustment is performed.

The cable 432 of FIG. 20 is connected to a wedge adjustment arrangement at the second wedge making station with the adjustment arrangement and operation being the same as that described above for the first wedge making station.

As mentioned previously, the injection mechanism 374 (see FIG. 19) is also adjusted in accordance with the axial length of the stator core. Adjustment cable or linkage 428 of FIG. 20 is connected to the injection adjustment arrangement illustrated in FIGS. 24 and 25 for accomplishing the adjustment of the injection mechanism.

Referring to FIG. 19, the travel distance of the wedge pushers 392 during the coil injection operation is determined by the distance between the wedge adjust flange 384 and the push plate 386. For example, for a $\frac{3}{4}$ inch core stack height or axial length, the desired distance between the flange and pusher plate is $\frac{5}{8}$ inch for the illustrated injection mechanism. On the other hand, it is desired to have a distance of $3\frac{3}{8}$ inches between the flange and pusher plate where the axial length of the core is $3\frac{1}{2}$ inches. In addition, the travel distance of the blades 110 of the injection tooling 56 is also varied in accordance with the axial length of the stator core 52 with this travel distance being determined by the distance between the pusher support ring 396 and the frame member 398. For example, it is desired to have this distance equal zero for a $\frac{3}{4}$ inch stack height and $2\frac{3}{4}$ inches for a $3\frac{1}{2}$ inch stack height or axial length.

The adjustment of the travel distances of the wedge pushers 392 and the injection tooling blades 110 is accomplished by rotation of the injection rod 380 by way of the adjustment gear 382 attached thereto. As the injection rod is rotated, the wedge adjustment flange 384 which is threadably engaged with the rod is moved along the rod, thus varying the distance between the wedge adjustment flange and the push plate 386. By varying this distance, the travel distance of the wedge pushers is adjusted in accordance with the axial length of the core.

Rotation of the injection rod 380 also causes the travel distance of the injection tooling blades 110 to vary. The injection rod is provided with a vertically extending groove (not shown) in the outer surface thereof. The sleeve 390 is provided with a pin (not shown) mounted therein so that the pin rides in the groove of the rod. Thus, the injection rod is allowed to move vertically within the sleeve. However, rotation of the injection rod also causes rotation of the sleeve having the pusher ring 396 threadably attached thereto. Thus, as the sleeve rotates, the distance between the pusher ring and the frame member 398 is varied. By varying this distance, the travel of the injection tooling blades during coil injection is varied in accordance with the axial length of the stator core.

Figure 24:
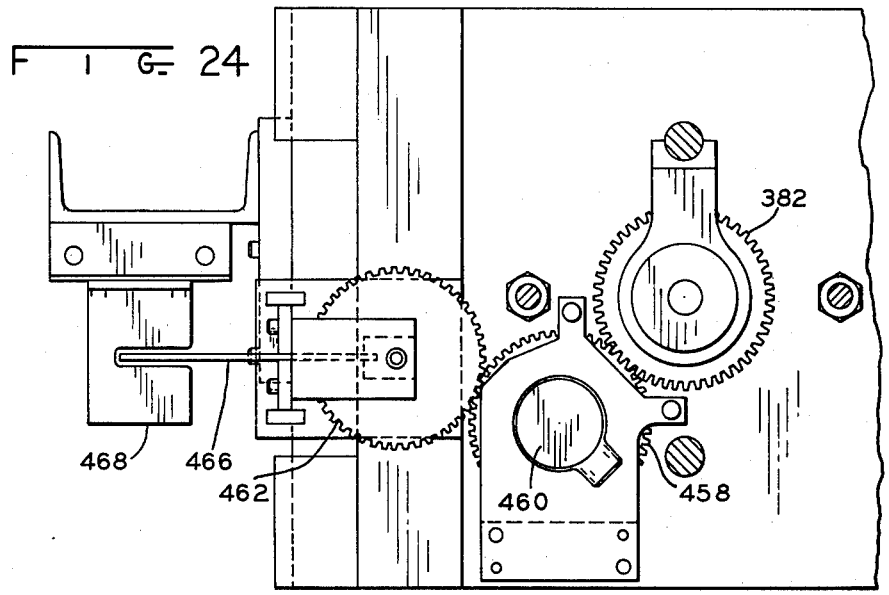
FIG. 24 is a plan view of a portion of the stator height adjustment arrangement employed to adjust the injection mechanism in accordance with the axial length of the core as selected by the arrangement illustrated in FIGS. 20 and 21.
Figure 25:
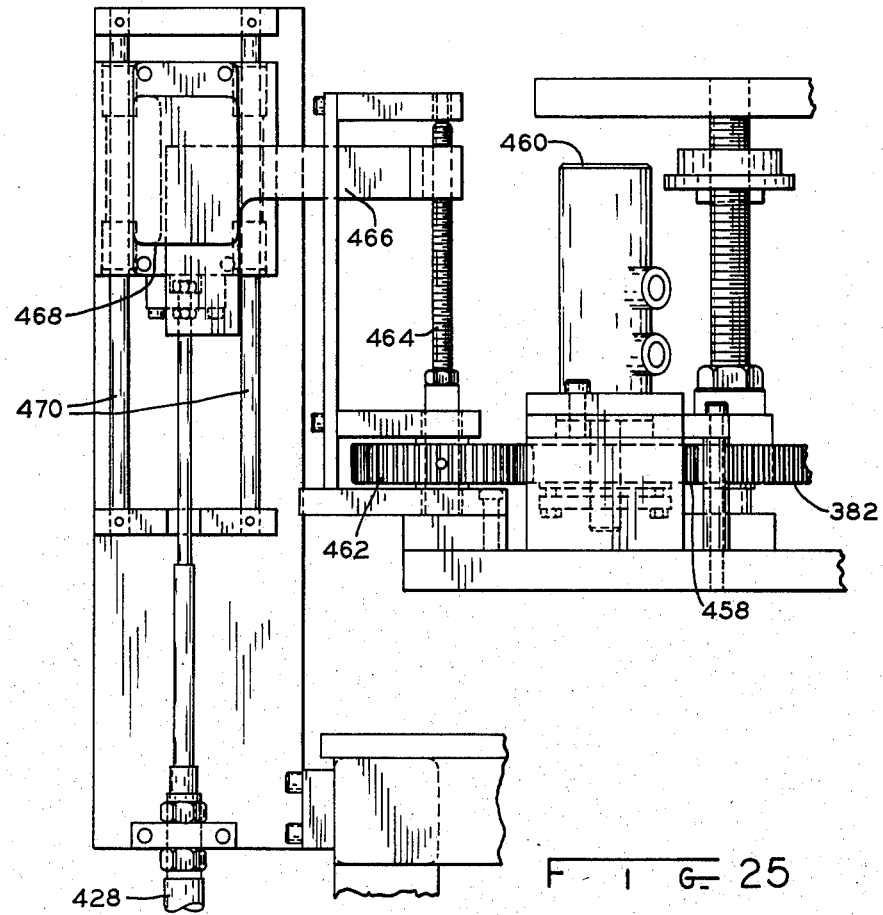
FIG. 25 is a side elevation of the position of the stator height adjustment arrangement illustrated in FIG. 26 showing mounting and interconnection details.

FIGS. 24 and 25 illustrate details of the injection mechanism adjustment arrangement for causing rotation of the adjustment gear 382 which accomplishes the above-described adjustment of the injection mechanism. As illustrated, the adjustment gear is engaged by motor gear 458 of adjustment motor 460. The motor gear also engages screw gear 462 having threaded member 464 attached thereto. The threaded member has vane 466 mounted thereon so that rotation of the screw gear causes vertical movement of the vane. The vane actuates magnetic switch 468 attached to rods 470 with the relative position of the switch on the rods being controlled by the cable or linkage 428 connected at the other end thereof for movement by the adjustment wheel 424 (see FIG. 20).

The adjustment of the injection mechanism 374 (see FIG. 19) is accomplished by rotating the adjustment wheel which by way of the cable 428 adjusts the position of the magnetic switch 468. The adjustment motor 460 is then energized to cause rotation of the adjustment gear 382 until the vane 466 attached to the screw gear 462 causes actuation of the magnetic switch; thus, the injection mechanism is adjusted in accordance with the axial length of the core. In order to assure consistent and repeatable adjustments, the adjustment motor initially moves the vane away from the switch and then causes the vane to approach the switch in the same direction each time an adjustment is performed.

After the respective winding turns 84 located on the injection tooling as shown in FIG. 17, have been inserted into the core slots and the injection rod 380 (see FIG. 19) of the injection mechanism has been retracted, the core lifting arm 342 is moved upwardly away from the injection tooling and then rotated back to its home position where the arm is again lowered so as to position the respective stator core 52 retained in the core holder 338 over end turn separator 354 shown in FIG. 17. After the winding turns have been inserted into the core slots, the end turns of the winding turns extend across the bore of the core; thus, in order to allow for subsequent operations such as mounting of a rotor within the bore, the end turns must be moved away from the bore.

FIGS. 17 and 18 illustrate details of the end turn separator 354 which is used to move end turns away from the bore. When the arm having the loaded core is lowered, arm locking pin 472 is received within aperture 474 (also illustrated in FIG. 12) to prevent lateral movement of the arm. Separator cylinder 476 is actuated causing separator plug 478 having a cone shaped tip 480 to move upwardly through the bore of the core. The end turns are moved along the cone shaped tip and away from the bore allowing subsequent assembly of a rotor within the bore. The upward travel distance or extension of the plug is controlled by pressure switch 482 illustrated in FIG. 18 with the pressure switch causing the cylinder to retract the plug after it has moved a sufficient distance to move the end turns away from the bore at both faces of the core. Limit switch 484 is actuated by the plug during its downward movement to indicate that the cylinder has been fully retracted. Of course, the arm of the core transfer assembly has two core holders, as discussed previously; thus winding turns contained on another injection tool can be inserted into another core retained in the oppositely disposed core holder simultaneous with the operation of the end turn separator.

After the end turns have been moved away from the bore of the loaded core, the core 52 is unclamped by activating the respective clamping cylinder 356 and removed from the core holder allowing placement of another core.

While the previously discussed loaded core was being transferred by the core transfer arm back to a home position for operation upon by the end turn separator, the index table 94 was rotated an additional 90 degrees, thus, moving the empty injection tooling to an unloading station 486 illustrated in FIG. 12 which in this embodiment is at the same location the tooling was initially loaded onto the indexing table. The tooling transfer assembly arm 260 picks up the empty tooling and then rotates to place the tooling upon one of the shuttle trays 54 positioned at the transfer station 86.

The shuttle tray with empty tooling thereon is moved away from the transfer station toward the selection station 50 (see FIG. 1) where another one of the stator cores 52 is loaded onto the tray for repeating the above-described operations.

While the invention has been described in terms of particular embodiments thereof, it should now be apparent that changes may be made without departing from the invention. It is, therefore, intended by the following claims to cover all such variations which are within the true spirit and scope of this invention.

What we claim as new and desire to secure by Letters Patent of the United States is:

1. In a tool pack for a coil injection machine particularly adapted for the axial insertion of windings into axial slots of a stator core; said pack including a plurality of longitudinally extending elements arranged in a circular pattern and together defining a circular pattern of longitudinally extending wire turn accommodating gaps, and a base holding said elements in assembled relation, the improvement wherein: a stripper is disposed within said elements; and a plurality of said elements are provided with pick-up recesses in the surfaces thereof adjacent the free ends thereof for interfitting engagement with a tool pack handling mechanism, whereby automatic assembly and disassembly of the tool pack with other coil injection machine parts is facilitated.

2. The tool pack of claim 1 wherein the base includes at least two angle portions with each portion having at least one alignment recess.

3. A method of axially placing winding turns in axially extending slots of a stator core with axial coil injection apparatus having a plurality of longitudinally extending gap defining elements disposed in a non-horizontal position; said method including: moving a core having a bore and first and second end faces with slots extending axially therebetween into proximity with the distal ends of the elements with a first face of the core facing away from the distal ends of the elements and a second face of the core facing toward the distal ends of the elements but spaced therefrom and supported by a core holder; moving an aligning means along the bore of the core in a direction toward the elements along a line directed from the first core face toward the second core face while the aligning means is maintained in aligned relation with the core slots, moving projections on the aligning means along gaps between the elements to assure axial alignment of the elements and slot defining teeth of the core and thereafter moving the core and elements relative to one another into registering engagement; holding the core in registering engagement with the elements and preventing movement of the core away from the elements with movable clamp means, while axially moving winding turns along the gaps and thence along the axial core slots; moving the clamp means away from the core; and removing the core with winding turns in the slots thereof from the core holder.

4. Apparatus for placing windings in a stator including tooling comprising blades extending along a non-horizontal axis and disposed in a circular pattern; an aligning means; means for supporting a stator core, having a bore therethrough, and for moving the core into position adjacent free ends of said blades; means for moving said aligning means along said bore and into alignment with said blades to align said stator core and said blades; means for extending said blades, during coil placing, from a retracted position to an extended position in which the free ends of said blades extend all the way through said bore; a stripper positioned within said blades and movable axially relative thereto; and means, spaced from said means for supporting, for holding a stator core in position along the free ends of said blades during a winding placing process.

5. The apparatus of claim 4 wherein the aligning means is mounted for independent parallel movement relative to the means for holding during a winding placing process.

6. The apparatus of claim 4 further including means for moving cores into proximity with the free ends of said blades.

7. The apparatus of claim 6 further including a conveyor for moving stator cores to the vicinity of said means for supporting cores, said conveyor comprising a plurality of sets of spaced apart rollers.

8. A method of placing windings in axially extending stator core slots, the method comprising: providing winding placing tooling comprising non-horizontally disposed blades, disposed in a circular pattern; positioning a stator core supported on a holder and having an axial bore communicating with the core slots adjacent free ends of the blades; and moving an aligning device into alignment with said blades while the device is aligned with the core slots and in the bore, thereby to align the stator core and the blades; moving the core onto the blades and constraining the core against movement with clamping means; inserting windings into core slots; releasing the core from the clamping means; and thereafter removing the core from the means supporting the core.

* * * * *